(12) United States Patent
LaPointe et al.

(10) Patent No.: US 8,575,245 B2
(45) Date of Patent: Nov. 5, 2013

(54) TUNABLE POLYMER COMPOSITIONS

(75) Inventors: Robert E. LaPointe, Syracuse, NY (US); Scott D. Allen, Ithaca, NY (US); Jeffrey R. Conuel, Ithaca, NY (US)

(73) Assignee: Novomer, Inc., Ithaca, NY (US)

( * ) Notice: Subject to any disclaimer, the term of this patent is extended or adjusted under 35 U.S.C. 154(b) by 0 days.

(21) Appl. No.: 13/141,532

(22) PCT Filed: Dec. 18, 2009

(86) PCT No.: PCT/US2009/068820
§ 371 (c)(1), (2), (4) Date: Jun. 22, 2011

(87) PCT Pub. No.: WO2010/075232
PCT Pub. Date: Jul. 1, 2010

(65) Prior Publication Data
US 2011/0257296 A1 Oct. 20, 2011

Related U.S. Application Data

(60) Provisional application No. 61/140,190, filed on Dec. 23, 2008.

(51) Int. Cl.
*C08L 69/00* (2006.01)
*C08K 5/3415* (2006.01)
*C08K 5/59* (2006.01)
*C08K 5/19* (2006.01)

(52) U.S. Cl.
USPC ............ 524/106; 524/122; 524/177; 524/238

(58) Field of Classification Search
USPC .................................. 524/238, 106, 122, 177
See application file for complete search history.

(56) References Cited

U.S. PATENT DOCUMENTS

| | | | |
|---|---|---|---|
| 3,900,424 A | 8/1975 | Inoue et al. | |
| 3,953,383 A | 4/1976 | Inoue et al. | |
| 5,879,856 A * | 3/1999 | Thackeray et al. | ........ 430/270.1 |
| 6,203,965 B1 * | 3/2001 | Cameron et al. | ........... 430/270.1 |
| 6,870,004 B1 | 3/2005 | Nguyen et al. | |
| 7,304,172 B2 | 12/2007 | Coates et al. | |
| 7,399,822 B2 | 7/2008 | Coates et al. | |
| 8,247,520 B2 | 8/2012 | Allen et al. | |

(Continued)

FOREIGN PATENT DOCUMENTS

| | | |
|---|---|---|
| WO | WO/2008/005979 | 1/2008 |
| WO | WO/2008/133807 | 11/2008 |

(Continued)

OTHER PUBLICATIONS

U.S. Appl. No. 61/052,061, filed May 9, 2008, Geoffrey W. Coates.

(Continued)

*Primary Examiner* — John Uselding
(74) *Attorney, Agent, or Firm* — Choate, Hall & Stewart LLP; Charles E. Lyon; John P. Rearick

(57) ABSTRACT

The present invention provides polycarbonate compositions having a tunable decomposition temperature. Suitable cationic additives (e.g., phosphonium, phosphazene, quaternary ammonium, guanidinium, pyridinium, arsonium, etc.) are disclosed for lowering the decomposition temperature of polymer compositions. The invention further provides methods of preparing such polymer compositions with tunable decomposition temperatures.

44 Claims, 19 Drawing Sheets

(56) References Cited

U.S. PATENT DOCUMENTS

| | | |
|---|---|---|
| 2004/0146803 A1 | 7/2004 | Kohl et al. |
| 2006/0089252 A1 | 4/2006 | Coates et al. |
| 2007/0000595 A1 | 1/2007 | Prack |
| 2008/0258344 A1 | 10/2008 | Regan et al. |
| 2010/0144969 A1 | 6/2010 | Coates et al. |
| 2011/0087001 A1 | 4/2011 | Coates et al. |
| 2011/0152497 A1 | 6/2011 | Allen et al. |
| 2011/0201779 A1 | 8/2011 | Cherian et al. |
| 2011/0207899 A1 | 8/2011 | Allen et al. |

FOREIGN PATENT DOCUMENTS

| | | |
|---|---|---|
| WO | WO/2009/026261 | 2/2009 |
| WO | WO 2009137540 A1 | 11/2009 |
| WO | WO/2010/022388 | 2/2010 |
| WO | WO/2010/033703 | 3/2010 |
| WO | WO/2010/033705 | 3/2010 |
| WO | WO/2010/060038 | 5/2010 |
| WO | WO/2011/163133 | 12/2011 |

OTHER PUBLICATIONS

Jayachandran, J.P. et al., J. Microelectromechanical Systems, vol. 12, pp. 147-159 (2003).
Coates et al. Angew. Chem. Int. Ed. 43, 6618-6639 (2004).
Wu, X. et al., J. Electrochem. Soc., vol. 150, pp. H205-H213 (2003).
Lu, C. et al., Polymer Engineering and Science, 830-840 (2007).
Li, W. et al., Nanotechnology, 14, pp. 578-583 (2003).
Nozaki et al., Angew Chem Int Ed. 45, 7274-7277 (2006).
Gao et al. Journal of Applied Polymer Science, vol. 108, 3626-3631 (2008).
Cupta et al. Journal of Applied Polymer Science, vol. 105, 2655-2662 (2007).
International Search Report for PCT/US2009/68820 mailed Feb. 18, 2010.

* cited by examiner

| Substance (mL added) | | mg PPC | ppm additive | Onset T (ºC) | OT Repeat (ºC) | $M_w$ |
|---|---|---|---|---|---|---|
| none | | | | 242.00 | | 286,000 |
| p-TSA.H2O (1) | 190.22 | 100 | 230 | 214.06 | | |
| p-TSA.H2O (5) | 190.22 | 100 | 1140 | 218.34 | | |
| p-TSA.H2O (20) | 190.22 | 100 | 4570 | 246.28 | | |
| triethanolamine (1) | 149.19 | 100 | 180 | 204.27 | 208.25 | 241036 |
| triethanolamine (5) | 149.19 | 100 | 90 | 197.13 | 199.59 | 234149 |
| triethanolamine (20) | 149.19 | 100 | 3580 | 180.58 | 170.81 | 192134 |
| (salcy)CoO2CCF3 (1) | 657.83 | 100 | 790 | 208.22 | | |
| (salcy)CoO2CCF3 (5) | 657.83 | 100 | 3950 | 207.17 | | |
| (salcy)CoO2CCF3 (20) | 657.83 | 100 | 15790 | 215.04 | | |
| PPNCl (1) | 574.03 | 100 | 690 | 182.81 | | 229289 |
| PPNCl (5) | 574.03 | 100 | 3440 | 148.70 | 154.21 | 207385 |
| PPNCl (20) | 574.03 | 100 | 13780 | 148.85 | 144.29 | 174695 |
| Ph4PCl (1) | 374.84 | 100 | 450 | 216.37 | | |
| Ph4PCl (5) | 374.84 | 100 | 2250 | 208.84 | | |
| Ph4PCl (20) | 374.84 | 100 | 9000 | 200.27 | | |
| $^nBu_4NOAc$ (1) | 301.51 | 100 | 360 | 211.53 | | |

Figure 1a

| Substance (mL added) | MW (g/mol) | mg PPC | ppm additive | Onset T (ºC) |
|---|---|---|---|---|
| Co + PPNCl (1) | 1231.9* | 100 | 1480** | 201.03 |
| Co + PPNCl (5) | 1231.9* | 100 | 7400** | 191.32 |
| Co + Ph₄PCl (1) | 1032.67* | 100 | 1240** | 201.44 |
| Co + Ph₄PCl (5) | 1032.67* | 100 | 6200** | 194.49 |
| Co + ⁿBu₄NOAc (1) | 959.34* | 100 | 1150** | 197.13 |
| Co + ⁿBu₄NOAc (5) | 959.34* | 100 | 5750** | 192.00 |
| Co + pTSA (1) | 848.05* | 100 | 1020** | 210.05 |
| Co + pTSA (5) | 848.05* | 100 | 5100** | 231.67 |
| Co + PPNCl + pTSA (1) | 1222.89* | 100 | 1710** | 204.06 |
| Co + PPNCl + pTSA (5) | 1222.89* | 100 | 8550** | 200.73 |
| Co + Ph₄PCl + pTSA (1) | 1422.12* | 100 | 1470** | 231.65 |
| Co + Ph₄PCl + pTSA (5) | 1422.12* | 100 | 7350** | 226.30 |
| Co + ⁿBu₄NOAc + pTSA (1) | 1149.56* | 100 | 1380** | 222.02 |
| Co + ⁿBu₄NOAc + pTSA (5) | 1149.56* | 100 | 6900** | 213.62 |

*Sum of molecular weights of all additives
**total concentration of all additives in mixture

Figure 1b

| Substance (mL added) | Additive mol wt (g/mol) | mg PPC | ppm additive | Onset T (°C) |
|---|---|---|---|---|
| none | | | | 225.33 |
| PPNCl (1) | 574.03 | 100 | 690 | 200.21 |
| PPNCl (1.5) | 574.03 | 100 | 1030 | 187.75 |
| PPNCl (2) | 574.03 | 100 | 1380 | 179.31 |
| PPNCl (2.5) | 574.03 | 100 | 1720 | 174.31 |
| PPNCl (3) | 574.03 | 100 | 2070 | 171.86 |
| PPNCl (3.5) | 574.03 | 100 | 2410 | 165.90 |
| PPNCl (4) | 574.03 | 100 | 2760 | 165.31 |
| $^n$Bu$_4$NOAc (1) | 301.51 | 100 | 360 | 213.45 |
| $^n$Bu$_4$NOAc (1.25) | 301.51 | 100 | 450 | 203.09 |
| $^n$Bu$_4$NOAc (1.5) | 301.51 | 100 | 540 | 181.20 |
| $^n$Bu$_4$NOAc (1.75) | 301.51 | 100 | 630 | 167.58 |
| $^n$Bu$_4$NOAc (2) | 301.51 | 100 | 720 | 148.83 |
| $^n$Bu$_4$NOAc (2.5) | 301.51 | 100 | 900 | 145.87 |
| $^n$Bu$_4$NOAc (3) | 301.51 | 100 | 1090 | 139.76 |
| BMIMCl (1) | 174.67 | 100 | 210 | 236.31 |
| BMIMCl (5) | 174.67 | 100 | 1050 | 165.40 |
| BMIMCl (20) | 174.67 | 100 | 4190 | 155.20 |

Figure 2a

| Substance (mL added) | mol wt g/mol | mg PPC | ppm additive | Onset T °C | $M_w$ |
|---|---|---|---|---|---|
| none | | | | 225.75 | 259,952 |
| PPNCl (1) | 574.03 | 100 | 690 | 202.48 | 258,132 |
| PPNCl (2) | 574.03 | 100 | 1380 | 178.04 | 247,252 |
| PPNCl (4) | 574.03 | 100 | 2760 | 164.94 | 255,856 |
| $^n$Bu$_4$NOAc (1) | 301.51 | 100 | 360 | 199.51 | 256,075 |
| $^n$Bu$_4$NOAc (2) | 301.51 | 100 | 720 | 151.44 | 254,624 |
| $^n$Bu$_4$NOAc (4) | 301.51 | 100 | 1450 | 140.69 | 255,782 |

Figure 3a

| Substance (mL added) | mol wt g/mol | mg PPC | g/Kg | Onset T °C |
|---|---|---|---|---|
| none | | | | 221.40 |
| PPNCl (1) | 574.03 | 100 | 690 | 201.68 |
| PPNCl (2) | 574.03 | 100 | 1380 | 176.25 |
| PPNCl (3) | 574.03 | 100 | 2070 | 169.84 |
| PPNCl (4) | 574.03 | 100 | 2760 | 164.43 |
| PPNCl (20) | 574.03 | 100 | 13780 | 147.65 |
| $^nBu_4NOH$ (1) | 259.47 | 100 | 310 | 138.11 |
| $^nBu_4NOH$ (5) | 259.47 | 100 | 1560 | |
| $^nBu_4NOH$ (20) | 259.47 | 100 | 6230 | |

Figure 4a

| Substance (mL added) | mol wt (g/mol) | mg PPC | g/Kg | Onset T (°C) | $M_w$ |
|---|---|---|---|---|---|
| none | | | | 242.00 | 286,000 |
| none | | | | 225.75 | 259,952 |
| none | | | | 225.33 | |
| none | | | | 221.40 | |
| PPNCl (1) | 574.03 | 100 | 690 | 182.81 | 229,289 |
| PPNCl (5) | 574.03 | 100 | 3440 | 148.70 | 207,335 |
| PPNCl (5) | 574.03 | 100 | 3440 | 154.21 | |
| PPNCl (20) | 574.03 | 100 | 13780 | 148.85 | 174,698 |
| PPNCl (20) | 574.03 | 100 | 13780 | 144.29 | |
| PPNCl (1) | 574.03 | 100 | 690 | 202.48 | 258,132 |
| PPNCl (2) | 574.03 | 100 | 1380 | 178.04 | 247,252 |
| PPNCl (4) | 574.03 | 100 | 2760 | 164.94 | 255,856 |
| PPNCl (1) | 574.03 | 100 | 690 | 200.21 | |
| PPNCl (1.5) | 574.03 | 100 | 1030 | 187.75 | |
| PPNCl (2) | 574.03 | 100 | 1380 | 179.31 | |
| PPNCl (2.5) | 574.03 | 100 | 1720 | 174.31 | |
| PPNCl (3) | 574.03 | 100 | 2070 | 171.86 | |
| PPNCl (3.5) | 574.03 | 100 | 2410 | 165.90 | |
| PPNCl (4) | 574.03 | 100 | 2760 | 165.31 | |
| PPNCl (1) | 574.03 | 100 | 690 | 201.68 | |
| PPNCl (2) | 574.03 | 100 | 1380 | 176.25 | |
| PPNCl (3) | 574.03 | 100 | 2070 | 169.84 | |
| PPNCl (4) | 574.03 | 100 | 2760 | 164.43 | |
| PPNCl (20) | 574.03 | 100 | 13780 | 147.65 | |

Figure 5a

| Substance (mL added) | mol wt g/mol | mg PPC | ppm | Onset T °C | $M_w$ |
|---|---|---|---|---|---|
| none | | | 0 | 225.75 | 259,952 |
| none | | | 0 | 225.33 | |
| none | | | 0 | 221.40 | |
| $^n$Bu₄NOAc (1) | 301.51 | 100 | 362 | 211.53 | 229289 |
| $^n$Bu₄NOAc (5) | 301.51 | 100 | 1809 | | 207385 |
| $^n$Bu₄NOAc (20) | 301.51 | 100 | 7236 | | |
| $^n$Bu₄NOAc (1) | 301.51 | 100 | 362 | 199.51 | 256,075 |
| $^n$Bu₄NOAc (2) | 301.51 | 100 | 724 | 151.44 | 254,624 |
| $^n$Bu₄NOAc (4) | 301.51 | 100 | 1447 | 140.69 | 255,782 |
| $^n$Bu₄NOAc (1) | 301.51 | 100 | 362 | 213.45 | |
| $^n$Bu₄NOAc (1.25) | 301.51 | 100 | 452 | 203.09 | |
| $^n$Bu₄NOAc (1.5) | 301.51 | 100 | 543 | 181.20 | |
| $^n$Bu₄NOAc (1.75) | 301.51 | 100 | 633 | 167.58 | |
| $^n$Bu₄NOAc (2) | 301.51 | 100 | 724 | 148.83 | |
| $^n$Bu₄NOAc (2.5) | 301.51 | 100 | 905 | 145.87 | |
| $^n$Bu₄NOAc (3) | 301.51 | 100 | 1085 | 139.76 | |

Figure 6a

| Sample Number | $^n$Bu$_4$NOAc (ppm) | Days elapsed | Onset T | $M_w$ |
|---|---|---|---|---|
| 1 | 0.0 | 0 | 235.83 | 268,727 |
| 2 | 543 | 0 | 170.37 | 267,425 |
| 3 | 0.0 | 8 | 220.11 | 266,310 |
| 4 | 543 | 8 | 185.45 | 267,712 |
| 5 | 0.0 | 22 | 213.50 | 253,866 |
| 6 | 543 | 22 | 187.74 | 254,639 |
| 7 | 0.0 | 36 | 214.17 | 258,524 |
| 8 | 543 | 36 | 176.41 | 258,651 |
| 9 | 0.0 | 50 | 218.20 | 253,998 |
| 10 | 543 | 50 | 171.57 | 254,826 |
| 11 | 0.0 | 64 | 220.12 | 252,574 |
| 12 | 543 | 64 | 173.36 | 253,350 |

Figure 7a

TUNABLE POLYMER COMPOSITIONS

CROSS REFERENCE TO RELATED APPLICATIONS

The present application claims priority under 35 U.S.C. §119(e) to U.S. provisional application Ser. No. 61/140,190, filed Dec. 23, 2008, the entire contents of which are hereby incorporated by reference.

FIELD OF THE INVENTION

The invention pertains to the field of polymers. More particularly, the invention pertains to polymer compositions having a modulated decomposition temperature and methods of preparing the same.

BACKGROUND OF THE INVENTION

Aliphatic polycarbonates (APCs) are biocompatible materials with numerous uses ranging from high-performance applications in material science to use as consumer packaging. Some applications of APCs (e.g., use as sacrifical polymer materials) require low metal content and a precisely defined thermal decomposition onset temperature as determined by thermogravimetric analysis (TGA). In some cases, it is particularly advantageous to have thermal decomposition temperatures below about 200° C. Certain preparations of polycarbonates are known to undergo thermolytic degradation in the range of about 200 to 350° C. It has been found that photosensitive polycarbonates with high thermolytic degradation temperatures undergo degradation at lower temperatures in the presence of catalytic amounts of acid (Jayachandran, J. P. et al., J. Microelectromechanical Systems, Vol. 12, 2003, pp. 147-159). However, this method lacks generality with respect to the polymer and requires the use of acid which may not be ideal for some applications. Therefore, there remains a need for new methods for tuning the decomposition temperature of APCs.

SUMMARY OF THE INVENTION

The present invention provides polymer compositions comprising one or more additives that modulate the polymer decomposition temperature. According to one aspect, provided compositions comprise:

a) a polymer selected from the group consisting of:

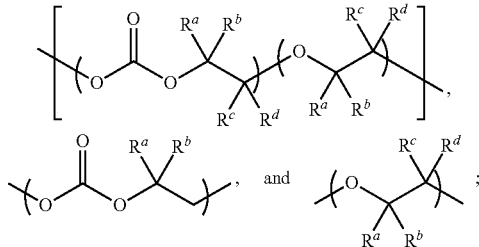

wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with intervening atoms to form one or more optionally substituted rings optionally containing one or more heteroatoms;

and b) an additive characterized in that it modulates the decomposition temperature of the polymer composition.

In certain embodiments, an additive lowers the decomposition temperature of the polymer composition. In certain embodiments, an additive comprises an organic cation. In some embodiments, an additive is a phosphonium species. In some embodiments, an additive is a quaternary ammonium species. In certain embodiments, an additive is a protonated amine species. In certain embodiments, an additive is bis(triphenylphosphoranylidene)ammonium chloride. In certain embodiments, an additive is butylmethylimidazolium chloride. In certain embodiments, an additive is tetrabutylammonium acetate.

In certain embodiments, an additive is present at a concentration from about 50 to 3500 ppm by weight. In certain embodiments, an additive is present at a concentration from about 100 to 1500 ppm by weight.

In some embodiments, the onset temperature of the polymer composition is about 100° C. to about 220° C. In some embodiments, the onset temperature of the polymer composition is about 120° C. to about 180° C. In some embodiments, the onset temperature of the polymer composition is about 120° C. to about 160° C. In certain embodiments, the polymer composition is substantially free of transition metals. In certain embodiments, the polymer composition is substantially free of cobalt. In some embodiments, the polymer composition comprises cobalt in an amount less than about 10 ppm.

In certain embodiments, provided polymer compositions are aliphatic polycarbonates. In some embodiments, $R^a$ is an aliphatic group. In some embodiments, $R^a$ is methyl. In some embodiments, $R^a$ and $R^c$ are taken together with intervening atoms to form a six-membered carbocyclic ring.

According to one aspect, the present disclosure provides a method for modulating the decomposition temperature of a polymer composition, the method comprising:

a) providing a polymer composition;

and b) admixing with the polymer composition an effective amount of an additive capable of modulating the decomposition temperature of the polymer composition.

In certain embodiments, the method comprises:
a) providing a polymer selected from the group consisting of:

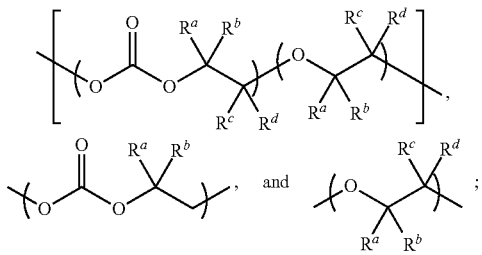

wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with intervening atoms to form one or more optionally substituted rings optionally containing one or more heteroatoms; and b) admixing the polymer composition with an effective amount of an additive capable of modulating the decomposition temperature of the polymer composition.

DEFINITIONS

Definitions of specific functional groups and chemical terms are described in more detail below. For purposes of this invention, the chemical elements are identified in accordance with the Periodic Table of the Elements, CAS version, Handbook of Chemistry and Physics, 75$^{th}$ Ed., a inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5$^{th}$ Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3$^{rd}$ Edition, Cambridge University Press, Cambridge, 1987; the entire contents of each of which are incorporated herein by reference.

Certain compounds of the present invention can comprise one or more asymmetric centers, and thus can exist in various stereoisomeric forms, e.g., enantiomers and/or diastereomers. Thus, inventive compounds and compositions thereof may be in the form of an individual enantiomer, diastereomer or geometric isomer, or may be in the form of a mixture of stereoisomers. In certain embodiments, the compounds of the invention are enantiopure compounds. In certain other embodiments, mixtures of enantiomers or diastereomers are provided.

Furthermore, certain compounds, as described herein may have one or more double bonds that can exist as either a Z or E isomer, unless otherwise indicated. The invention additionally encompasses the compounds as individual isomers substantially free of other isomers and alternatively, as mixtures of various isomers, e.g., racemic mixtures of enantiomers. In addition to the above-mentioned compounds per se, this invention also encompasses compositions comprising one or more compounds.

As used herein, the term "isomers" includes any and all geometric isomers and stereoisomers. For example, "isomers" include cis- and trans-isomers, E- and Z-isomers, R- and S-enantiomers, diastereomers, (D)-isomers, (L)-isomers, racemic mixtures thereof, and other mixtures thereof, as falling within the scope of the invention. For instance, a compound may, in some embodiments, be provided substantially free of one or more corresponding stereoisomers, and may also be referred to as "stereochemically enriched."

The terms "halo" and "halogen" as used herein refer to an atom selected from fluorine (fluoro, —F), chlorine (chloro, —Cl), bromine (bromo, —Br), and iodine (iodo, —I).

The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Unless otherwise specified, aliphatic groups contain 1-30 carbon atoms. In certain embodiments, aliphatic groups contain 1-12 carbon atoms. In certain embodiments, aliphatic groups contain 1-8 carbon atoms. In certain embodiments, aliphatic groups contain 1-6 carbon atoms. In some embodiments, aliphatic groups contain 1-5 carbon atoms, in some embodiments, aliphatic groups contain 1-4 carbon atoms, in yet other embodiments aliphatic groups contain 1-3 carbon atoms, and in yet other embodiments aliphatic groups contain 1-2 carbon atoms. Suitable aliphatic groups include, but are not limited to, linear or branched, alkyl, alkenyl, and alkynyl groups, and hybrids thereof such as (cycloalkyl)alkyl, (cycloalkenyl)alkyl or (cycloalkyl)alkenyl.

The term "heteroaliphatic" or "heteroaliphatic group", as used herein, denotes an optionally substituted hydrocarbon moiety having, in addition to carbon atoms, from one to five heteroatoms, that may be straight-chain (i.e., unbranched), branched, or cyclic ("heterocyclic") and may be completely saturated or may contain one or more units of unsaturation, but which is not aromatic. The term "heteroatom" refers to nitrogen, oxygen, or sulfur, and includes any oxidized form of nitrogen or sulfur, and any quaternized form of a basic nitrogen. The term "nitrogen" also includes a substituted nitrogen. Unless otherwise specified, heteroaliphatic groups contain 1-6 carbon atoms wherein 1-3 carbon atoms are optionally and independently replaced with heteroatoms selected from oxygen, nitrogen and sulfur. In some embodiments, heteroaliphatic groups contain 1-4 carbon atoms, wherein 1-2 carbon atoms are optionally and independently replaced with heteroatoms selected from oxygen, nitrogen and sulfur. In yet other embodiments, heteroaliphatic groups contain 1-3 carbon atoms, wherein 1 carbon atom is optionally and independently replaced with a heteroatom selected from oxygen, nitrogen and sulfur. Suitable heteroaliphatic groups include, but are not limited to, linear or branched, heteroalkyl, heteroalkenyl, and heteroalkynyl groups.

The term "epoxide", as used herein, refers to a substituted oxirane. Such substituted oxiranes include monosubstituted oxiranes, disubstituted oxiranes, trisubstituted oxiranes, and tetrasubstituted oxiranes. Such epoxides may be further optionally substituted as defined herein. In certain embodiments, epoxides comprise a single oxirane moiety. In certain embodiments, epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. In certain embodiments, a polymer is comprised of only one monomer species (e.g., polyethylene oxide). In certain embodiments, a polymer of the present invention is a copolymer, terpolymer, heteropolymer, block copolymer, or tapered heteropolymer of one or more epoxides.

The term "unsaturated", as used herein, means that a moiety has one or more double or triple bonds.

The terms "cycloaliphatic", "carbocycle", or "carbocyclic", used alone or as part of a larger moiety, refer to a saturated or partially unsaturated monocyclic, bicyclic, or polycyclic ring systems, as described herein, having from 3 to 20 members, wherein the aliphatic ring system is optionally substituted as defined above and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, bicyclo[2.2.1]heptyl, norbornyl, spiro[4.5]decyl, and cyclooctadienyl. In some embodiments, the cycloalkyl has 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. In some embodiments, a carbocyclic group is bicyclic. In some embodiments, a carbocyclic group is tricyclic. In some embodiments, a carbocyclic group is polycyclic. In certain embodiments, the terms "3- to 14-membered carbocycle" and "$C_{3-14}$ carbocycle" refer to a 3- to 8-membered saturated or partially unsaturated monocyclic carbocyclic ring, or a 7- to 14-membered saturated or partially unsaturated polycyclic carbocyclic ring.

The term "alkyl," as used herein, refers to saturated, straight- or branched-chain hydrocarbon radicals derived from an aliphatic moiety containing between one and six carbon atoms by removal of a single hydrogen atom. Unless otherwise specified, alkyl groups contain 1-12 carbon atoms. In certain embodiments, alkyl groups contain 1-8 carbon atoms. In certain embodiments, alkyl groups contain 1-6 carbon atoms. In some embodiments, alkyl groups contain 1-5 carbon atoms. In some embodiments, alkyl groups contain 1-4 carbon atoms. In certain embodiments, alkyl groups contain 1-3 carbon atoms. In some embodiments, alkyl groups contain 1-2 carbon atoms. Examples of alkyl radicals include, but are not limited to, methyl, ethyl, n-propyl, isopropyl, n-butyl, iso-butyl, sec-butyl, sec-pentyl, iso-pentyl, tert-butyl, n-pentyl, neopentyl, n-hexyl, sec-hexyl, n-heptyl, n-octyl, n-decyl, n-undecyl, dodecyl, and the like.

The term "alkenyl," as used herein, denotes a monovalent group derived from a straight- or branched-chain aliphatic moiety having at least one carbon-carbon double bond by the removal of a single hydrogen atom. Unless otherwise specified, alkenyl groups contain 2-12 carbon atoms. In certain embodiments, alkenyl groups contain 2-8 carbon atoms. In certain embodiments, alkenyl groups contain 2-6 carbon atoms. In some embodiments, alkenyl groups contain 2-5 carbon atoms. In some embodiments, alkenyl groups contain 2-4 carbon atoms. In some embodiments, alkenyl groups contain 2-3 carbon atoms. In some embodiments, alkenyl groups contain 2 carbon atoms. Alkenyl groups include, for example, ethenyl, propenyl, butenyl, 1-methyl-2-buten-1-yl, and the like.

The term "alkynyl," as used herein, refers to a monovalent group derived from a straight- or branched-chain aliphatic moiety having at least one carbon-carbon triple bond by the removal of a single hydrogen atom. Unless otherwise specified, alkynyl groups contain 2-12 carbon atoms. In certain embodiments, alkynyl groups contain 2-8 carbon atoms. In certain embodiments, alkynyl groups contain 2-6 carbon atoms. In some embodiments, alkynyl groups contain 2-5 carbon atoms, in some embodiments, alkynyl groups contain 2-4 carbon atoms, in yet other embodiments alkynyl groups contain 2-3 carbon atoms, and in yet other embodiments alkynyl groups contain 2 carbon atoms. Representative alkynyl groups include, but are not limited to, ethynyl, 2-propynyl (propargyl), 1-propynyl, and the like.

The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring". In certain embodiments of the present invention, "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like. In certain embodiments, the terms "6- to 10-membered aryl" and "$C_{6-10}$ aryl" refer to a phenyl or an 8- to 10-membered polycyclic aryl ring. In certain embodiments, the terms "6- to 14-membered aryl" and "$C_{6-14}$ aryl" refer to a phenyl or an 8- to 14-membered polycyclic aryl ring.

The terms "heteroaryl" and "heteroar-", used alone or as part of a larger moiety, e.g., "heteroaralkyl", or "heteroaralkoxy", refer to groups having 5 to 14 ring atoms, preferably 5, 6, or 9 ring atoms; having 6, 10, or 14 π electrons shared in a cyclic array; and having, in addition to carbon atoms, from one to five heteroatoms. The term "heteroatom" refers to nitrogen, oxygen, or sulfur, and includes any oxidized form of nitrogen or sulfur, and any quaternized form of a basic nitrogen. Heteroaryl groups include, without limitation, thienyl, furanyl, pyrrolyl, imidazolyl, pyrazolyl, triazolyl, tetrazolyl, oxazolyl, isoxazolyl, oxadiazolyl, thiazolyl, isothiazolyl, thiadiazolyl, pyridyl, pyridazinyl, pyrimidinyl, pyrazinyl, indolizinyl, purinyl, naphthyridinyl, benzofuranyl and pteridinyl. The terms "heteroaryl" and "heteroar-", as used herein, also include groups in which a heteroaromatic ring is fused to one or more aryl, cycloaliphatic, or heterocyclyl rings, where the radical or point of attachment is on the heteroaromatic ring. Nonlimiting examples include indolyl, isoindolyl, benzothienyl, benzofuranyl, dibenzofuranyl, indazolyl, benzimidazolyl, benzthiazolyl, quinolyl, isoquinolyl, cinnolinyl, phthalazinyl, quinazolinyl, quinoxalinyl, 4H-quinolizinyl, carbazolyl, acridinyl, phenazinyl, phenothiazinyl, phenoxazinyl, tetrahydroquinolinyl, tetrahydroisoquinolinyl, and pyrido[2,3-b]-1,4-oxazin-3(4H)-one. A heteroaryl group may be mono- or bicyclic. The term "heteroaryl" may be used interchangeably with the terms "heteroaryl ring", "heteroaryl group", or "heteroaromatic", any of which terms include rings that are optionally substituted. The term "heteroaralkyl" refers to an alkyl group substituted by a heteroaryl, wherein the alkyl and heteroaryl portions independently are optionally substituted. The term "heteroaralkyl" refers to an alkyl group substituted by a heteroaryl, wherein the alkyl and heteroaryl portions independently are optionally substituted. In certain embodiments, the term "5- to 10-membered heteroaryl" refers to a 5- to 6-membered heteroaryl ring having 1 to 3 heteroatoms independently selected from nitrogen, oxygen, or sulfur, or an 8- to 10-membered bicyclic heteroaryl ring having 1 to 4 heteroatoms independently selected from nitrogen, oxygen, or sulfur. In certain embodiments, the term "5- to 14-membered heteroaryl" refers to a 5- to 6-membered heteroaryl ring having 1 to 3 heteroatoms independently selected from nitrogen, oxygen, or sulfur, or an 8- to 14-membered polycyclic heteroaryl ring having 1 to 4 heteroatoms independently selected from nitrogen, oxygen, or sulfur.

As used herein, the terms "heterocycle", "heterocyclyl", "heterocyclic radical", and "heterocyclic ring" are used interchangeably and refer to a stable 3- to 7-membered monocyclic or 7-14-membered bicyclic heterocyclic moiety that is either saturated or partially unsaturated, and having, in addition to carbon atoms, one or more, preferably one to four, heteroatoms, as defined above. When used in reference to a ring atom of a heterocycle, the term "nitrogen" includes a substituted nitrogen. As an example, in a saturated or partially unsaturated ring having 0-3 heteroatoms selected from oxygen, sulfur or nitrogen, the nitrogen may be N (as in 3,4-dihydro-2H-pyrrolyl), NH (as in pyrrolidinyl), or $^+$NR (as in N-substituted pyrrolidinyl). In some embodiments, the term "3- to 7-membered heterocyclic" refers to a 3- to 7-membered saturated or partially unsaturated monocyclic heterocyclic ring having 1 to 2 heteroatoms independently selected from nitrogen, oxygen, or sulfur. In some embodiments, the term "3- to 8-membered heterocycle" refers to a 3- to 8-membered saturated or partially unsaturated monocyclic heterocyclic ring having 1 to 2 heteroatoms independently selected from nitrogen, oxygen, or sulfur. In some embodiments, the term "3- to 12-membered heterocyclic" refers to a 3- to 8-membered saturated or partially unsaturated monocyclic heterocyclic ring having 1 to 2 heteroatoms independently selected from nitrogen, oxygen, or sulfur, or a 7- to 12-membered saturated or partially unsaturated polycyclic heterocyclic ring having 1-3 heteroatoms independently selected from nitrogen, oxygen, or sulfur. In some embodiments, the term "3- to 14-membered heterocycle" refers to a 3- to 8-membered saturated or partially unsaturated monocyclic heterocyclic ring having 1 to 2 heteroatoms independently selected from nitrogen, oxygen, or sulfur, or a 7- to 14-membered saturated or partially unsaturated polycyclic heterocyclic ring having 1-3 heteroatoms independently selected from nitrogen, oxygen, or sulfur.

A heterocyclic ring can be attached to its pendant group at any heteroatom or carbon atom that results in a stable structure and any of the ring atoms can be optionally substituted. Examples of such saturated or partially unsaturated heterocyclic radicals include, without limitation, tetrahydrofuranyl, tetrahydrothienyl, pyrrolidinyl, pyrrolidonyl, piperidinyl, pyrrolinyl, tetrahydroquinolinyl, tetrahydroisoquinolinyl, decahydroquinolinyl, oxazolidinyl, piperazinyl, dioxanyl, dioxolanyl, diazepinyl, oxazepinyl, thiazepinyl, morpholinyl, and quinuclidinyl. The terms "heterocycle", "heterocyclyl", "heterocyclyl ring", "heterocyclic group", "heterocyclic moiety", and "heterocyclic radical", are used interchangeably herein, and also include groups in which a heterocyclyl ring is fused to one or more aryl, heteroaryl, or cycloaliphatic rings, such as indolinyl, 3H-indolyl, chromanyl, phenanthridinyl, or tetrahydroquinolinyl, where the radical or point of attachment is on the heterocyclyl ring. A heterocyclyl group may be mono- or bicyclic. The term "heterocyclylalkyl" refers to an alkyl group substituted by a heterocyclyl, wherein the alkyl and heterocyclyl portions independently are optionally substituted.

As used herein, the term "partially unsaturated" refers to a ring moiety that includes at least one double or triple bond. The term "partially unsaturated" is intended to encompass rings having multiple sites of unsaturation, but is not intended to include aryl or heteroaryl moieties, as herein defined.

As described herein, compounds of the invention may contain "optionally substituted" moieties. In general, the term "substituted", whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. The term "stable", as used herein, refers to compounds that are not substantially altered when subjected to conditions to allow for their production, detection, and, in certain embodiments, their recovery, purification, and use for one or more of the purposes disclosed herein.

In some chemical structures herein, substituents are shown attached to a bond which crosses a bond in a ring of the depicted molecule. It will be appreciated that this indicates that one or more of the substituents may be attached to the ring at any available position (usually in place of a hydrogen atom of the parent structure). In cases where an atom of a ring so substituted has two substitutable positions, two groups may be present on the same ring atom. Unless otherwise indicated, when more than one substituent is present, each is defined independently of the others, and each may have a different structure. In cases where the substituent shown crossing a bond of the ring is —R, this has the same meaning as if the ring were said to be "optionally substituted" as described in the preceding paragraph.

Suitable monovalent substituents on a substitutable carbon atom of an "optionally substituted" group are independently halogen; —$(CH_2)_{0-4}R^\circ$; —$(CH_2)_{0-4}OR^\circ$; —O—$(CH_2)_{0-4}C(O)OR^\circ$; —$(CH_2)_{0-4}CH(OR_2)_2$; —$(CH_2)_{0-4}SR^\circ$; —$(CH_2)_{0-4}Ph$, which may be substituted with $R^\circ$; —$(CH_2)_{0-4}O(CH_2)_{0-1}Ph$ which may be substituted with $R^\circ$; —CH=CHPh, which may be substituted with $R^\circ$; $NO_2$; —CN; —$N_3$; —$(CH_2)_{0-4}N(R^\circ)_2$; —$(CH_2)_{0-4}N^+(R^\circ)_3$, —$(CH_2)_{0-4}N(R^\circ)C(O)R^\circ$; —$N(R^\circ)C(S)R^\circ$; —$(CH_2)_{0-4}N(R^\circ)C(O)NR^\circ_2$; —$N(R^\circ)C(S)NR^\circ_2$; —$(CH_2)_{0-4}N(R^\circ)C(O)OR^\circ$; —$N(R^\circ)N(R^\circ)C(O)R^\circ$; —$N(R^\circ)N(R^\circ)C(O)NR^\circ_2$; —$N(R^\circ)N(R^\circ)C(O)OR^\circ$; —$(CH_2)_{0-4}C(O)R^\circ$; —$C(S)R^\circ$; —$(CH_2)_{0-4}C(O)OR^\circ$; —$(CH_2)_{0-4}C(O)N(R^\circ)_2$; —$(CH_2)_{0-4}C(O)SR^\circ$; —$(CH_2)_{0-4}C(O)OSiR^\circ_3$; —$(CH_2)_{0-4}OC(O)R^\circ$; —$OC(O)(CH_2)_{0-4}SR$—, $SC(S)SR^\circ$; —$(CH_2)_{0-4}SC(O)R^\circ$; —$(CH_2)_{0-4}C(O)NR^\circ_2$; —$C(S)NR^\circ_2$; —$C(S)SR^\circ$; —$SC(S)SR^\circ$, —$(CH_2)_{0-4}OC(O)NR^\circ_2$; —$C(O)N(OR^\circ R^\circ$; —C(O)C (O)R°; —C(O)CH$_2$C(O)R°; —C(NOR°)R°; —(CH$_2$)$_{0-4}$SSR°; —(CH$_2$)$_{0-4}$S(O)$_2$R°; —(CH$_2$)$_{0-4}$S(O)$_2$OR°; —(CH$_2$)$_{0-4}$OS(O)$_2$R°; —S(O)$_2$NR°$_2$; —(CH$_2$)$_{0-4}$S(O)R°; —N(R°)S(O)$_2$NR°$_2$; —N(R°)S(O)$_2$R°; —N(OR°)R°; —C(NH)NR°$_2$; —P(O)$_2$R°; —P(O)R°$_2$; —OP(O)R°$_2$; —OP(O)(OR°)$_2$; SiR°$_3$; —(C$_{1-4}$ straight or branched)alkylene)O—N(R°)$_2$; or —(C$_{1-4}$ straight or branched)alkylene)C(O)O—N(R°)$_2$, wherein each R° may be substituted as defined below and is independently hydrogen, C$_{1-8}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur, or, notwithstanding the definition above, two independent occurrences of R°, taken together with their intervening atom(s), form a 3-12-membered saturated, partially unsaturated, or aryl mono- or polycyclic ring having 0-4 heteroatoms independently selected from nitrogen, oxygen, or sulfur, which may be substituted as defined below.

Suitable monovalent substituents on R° (or the ring formed by taking two independent occurrences of R° together with their intervening atoms), are independently halogen, —(CH$_2$)$_{0-2}$R●, —(haloR●), —(CH$_2$)$_{0-2}$OH, —(CH$_2$)$_{0-2}$OR●, —(CH$_2$)$_{0-2}$CH(OR●)$_2$; —O(haloR●), —CN, —N$_3$, —(CH$_2$)$_{0-2}$C(O)R●, —(CH$_2$)$_{0-2}$C(O)OH, —(CH$_2$)$_{0-2}$C(O)OR●), —(CH$_2$)$_{0-4}$C(O)N(R°)$_2$; —(CH$_2$)$_{0-2}$SR●, —(CH$_2$)$_{0-2}$SH, —(CH$_2$)$_{0-2}$NH$_2$, —(CH$_2$)$_{0-2}$NHR●, —(CH$_2$)$_{0-2}$NR●$_2$, —NO$_2$, —SiR●$_3$, —OSiR●$_3$, —C(O)SR●, —(C$_{1-4}$ straight or branched alkylene)C(O)OR●, or —SSR● wherein each R● is unsubstituted or where preceded by "halo" is substituted only with one or more halogens, and is independently selected from C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur. Suitable divalent substituents on a saturated carbon atom of R° include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R●, —(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR†$_2$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur. A substitutable nitrogen may be substituted with three R† substituents to provide a charged ammonium moiety —N$^+$(R†)$_3$, wherein the ammonium moiety is further complexed with a suitable counterion.

Suitable substituents on the aliphatic group of R† are independently halogen, —R●, —(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

As used herein, the term "catalyst" refers to a substance the presence of which increases the rate and/or extent of a chemical reaction, while not being consumed or undergoing a permanent chemical change itself.

As used herein, in reference to a polymer, the term "substantially" means that a polymer contains at least about 98 mole percent of a particular polymer repeat unit. In some embodiments, a polymer that is substantially a particular polymer repeat unit is at least about 99 mole percent of the polymer repeat unit. In some embodiments, a polymer that is substantially a particular polymer repeat unit is at least about 99.9 mole percent of the polymer repeat unit. In some embodiments, a polymer that is substantially a particular polymer repeat unit is at least about 99.99 mole percent of the polymer repeat unit.

The term "substantially free", unless otherwise indicated, means less than about 5 percent by weight of a composition. In some embodiments, a composition that is substantially free of a substance contains less than about 2 percent by weight of the substance in the composition. In some embodiments, a composition that is substantially free of a substance contains less than about 1 percent by weight of the substance in the composition. In some embodiments, a composition that is substantially free of a substance contains less than about 0.1 percent by weight of the substance in the composition. In some embodiments, a composition that is substantially free of a substance contains less than about 0.01 percent by weight of the substance in the composition. In some embodiments, a composition that is substantially free of a substance contains less than about 0.001 percent by weight of the substance in the composition. In some embodiments, a composition that is substantially free of a substance contains less than an amount of the substance than can be measured by standard techniques.

As used herein, the "term head-to-tail" or "HT", refers to the regiochemistry of adjacent repeating units in a polymer chain. For example, in the context of poly(propylene carbonate) (PPC), the term head-to-tail based on the three regiochemical possibilities depicted below:

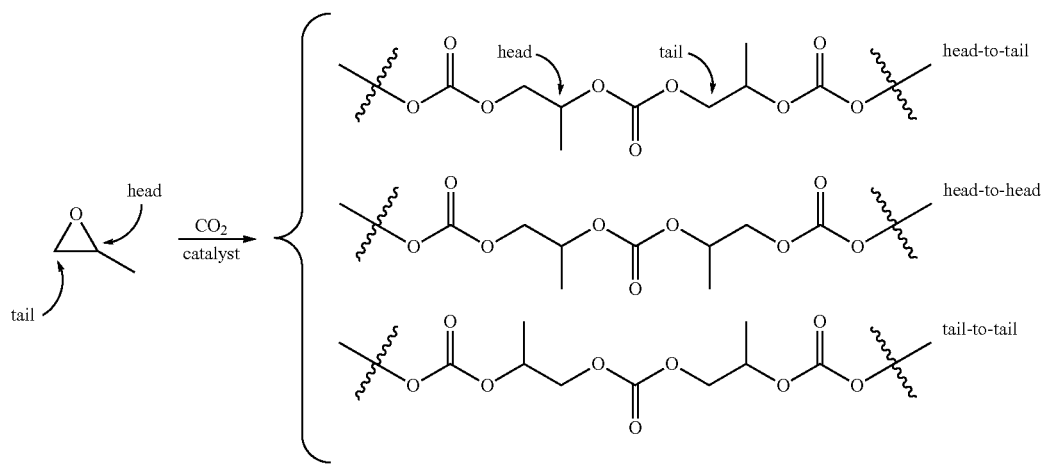

The term head-to-tail ratio (H:T) refers to the proportion of head-to-tail linkages to the sum of all other regiochemical possibilities.

As used herein, the term "onset temperature" means the minimum temperature at which rapid decomposition of a polymer material occurs. This may be determined using TGA by standard methods known in the art.

BRIEF DESCRIPTION OF THE DRAWINGS

FIGS. 1a, 1b, 1c, 2a, and 2b depict the effects of certain additives on the decomposition onset temperature of poly (propylene carbonate).

FIGS. 3a, 3b, 4a, and 4b depict the effects of tetrabutylammonium acetate, tetrabutylammonium hydroxide, and bis (triphenylphosphoranylidene)ammonium chloride on the decomposition onset temperature and molecular weight of poly(propylene carbonate).

FIGS. 5a and 5b depict the effects of bis(triphenylphosphoranylidene)ammonium chloride on the decomposition onset temperature and molecular weight of poly(propylene carbonate).

FIGS. 6a, 6b, and 6c depict the effects of tetrabutylammonium acetate on the decomposition onset temperature and molecular weight of poly(propylene carbonate).

FIGS. 7a, 7b, and 7c depict a stability study of a PPC composition treated with tetrabutylammonium acetate.

DETAILED DESCRIPTION OF CERTAIN EMBODIMENTS

Figure 1C:
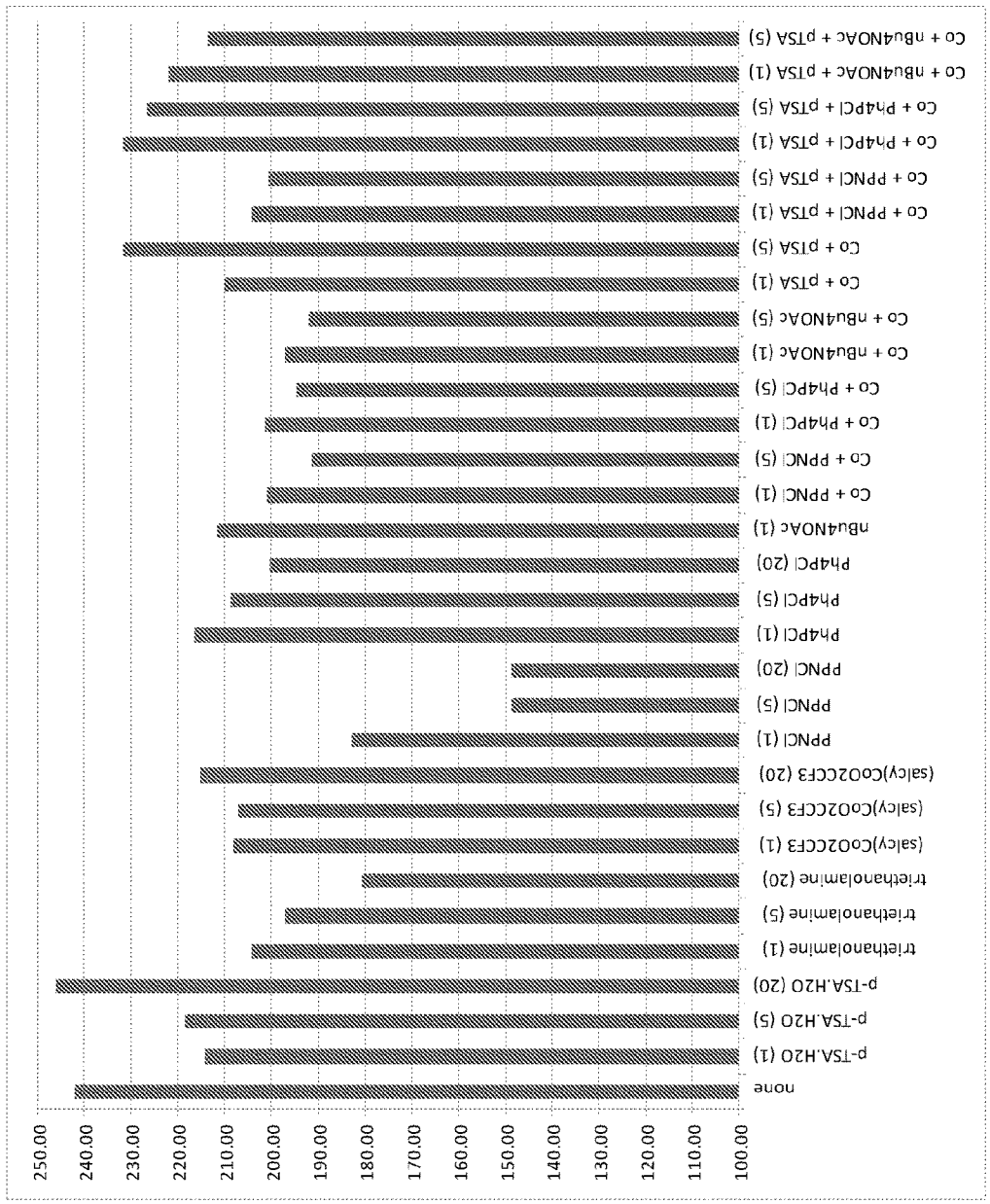
Figure 2B:
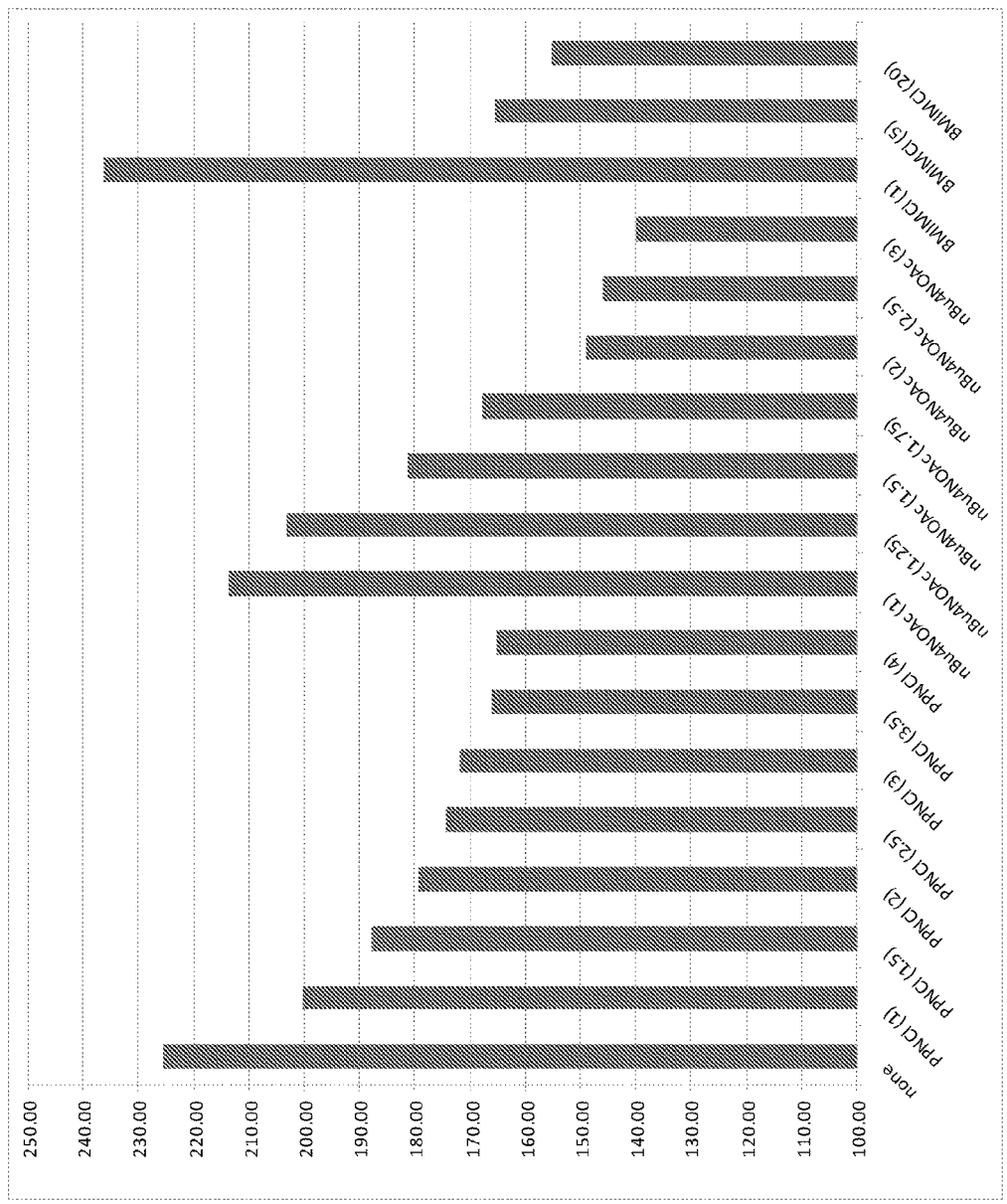
Figure 3B:
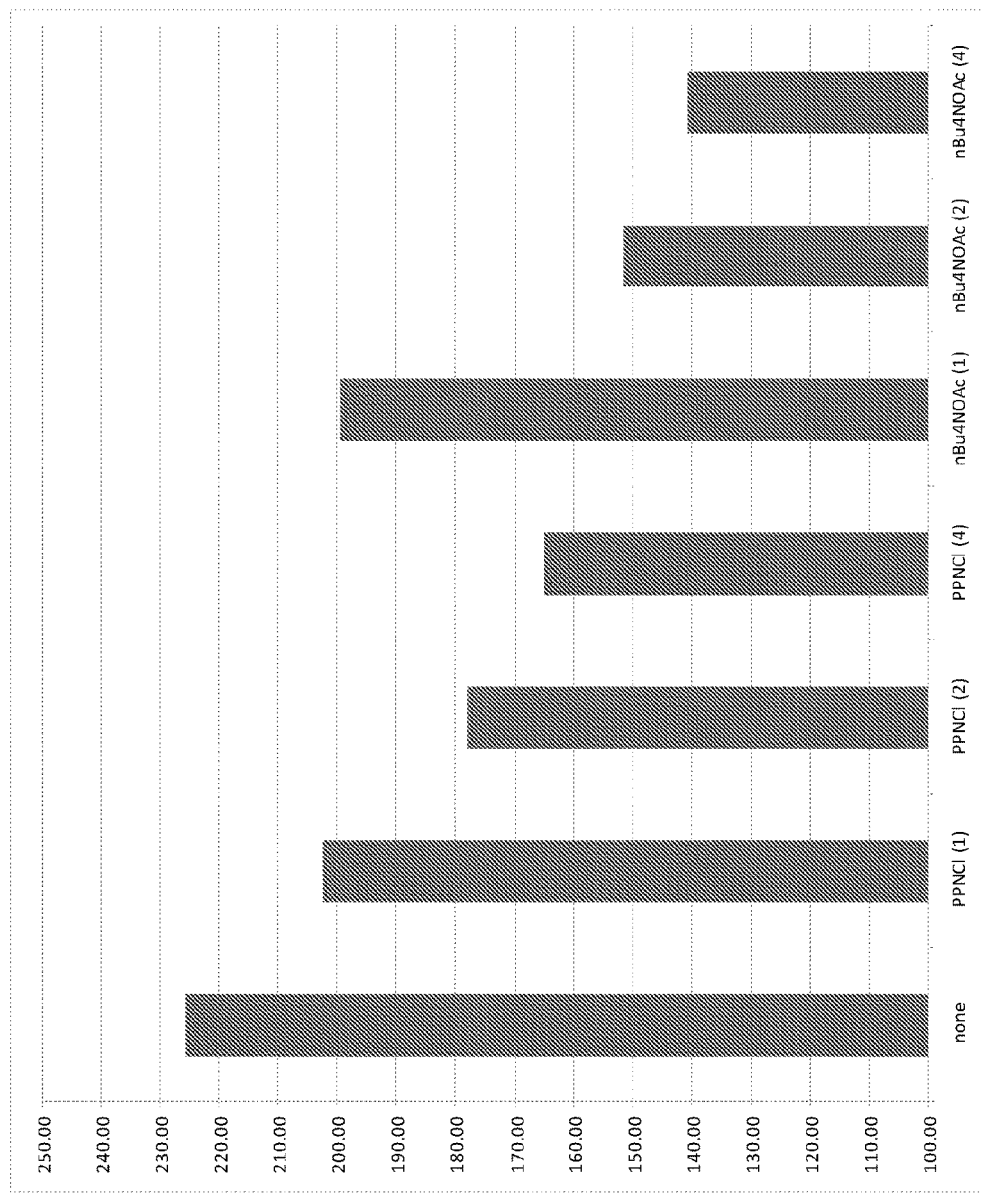
Figure 4B:
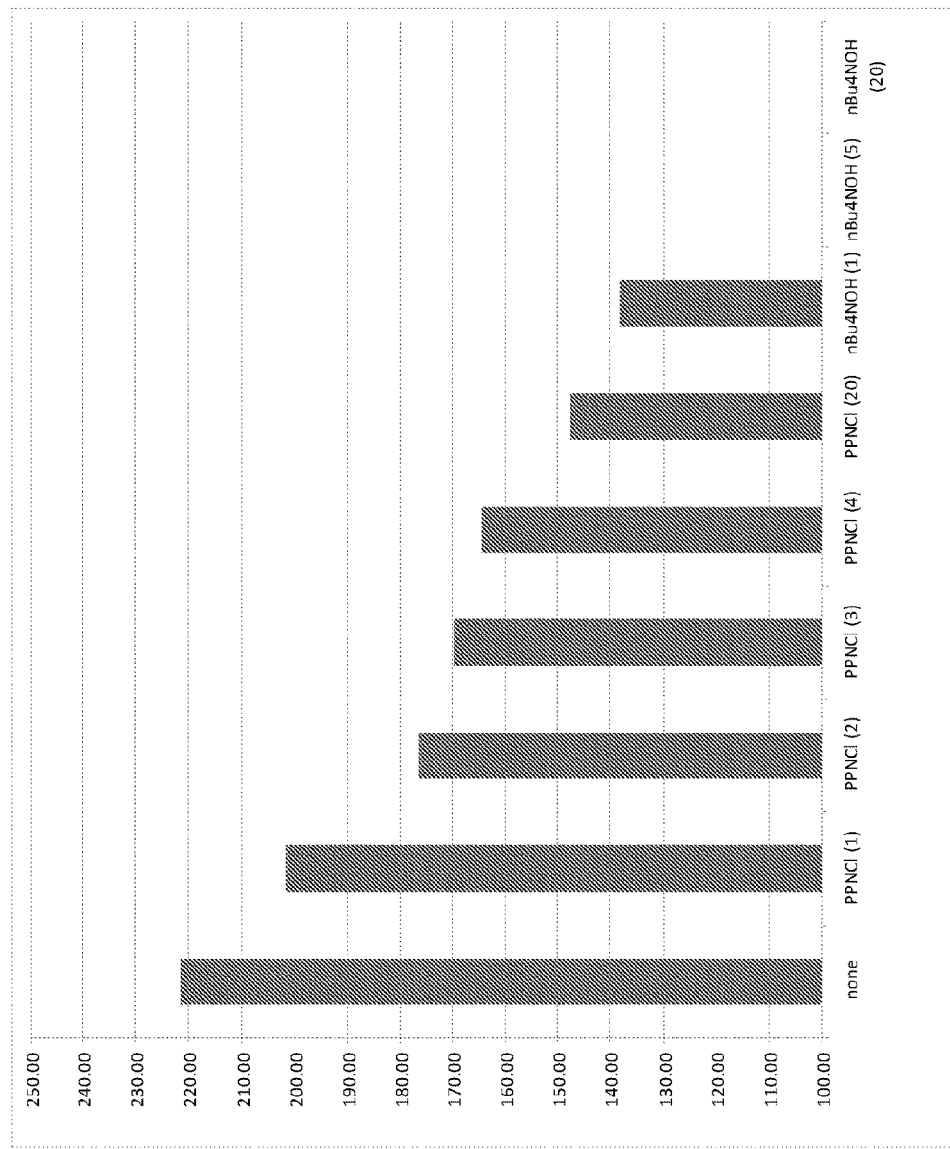
Figure 5B:
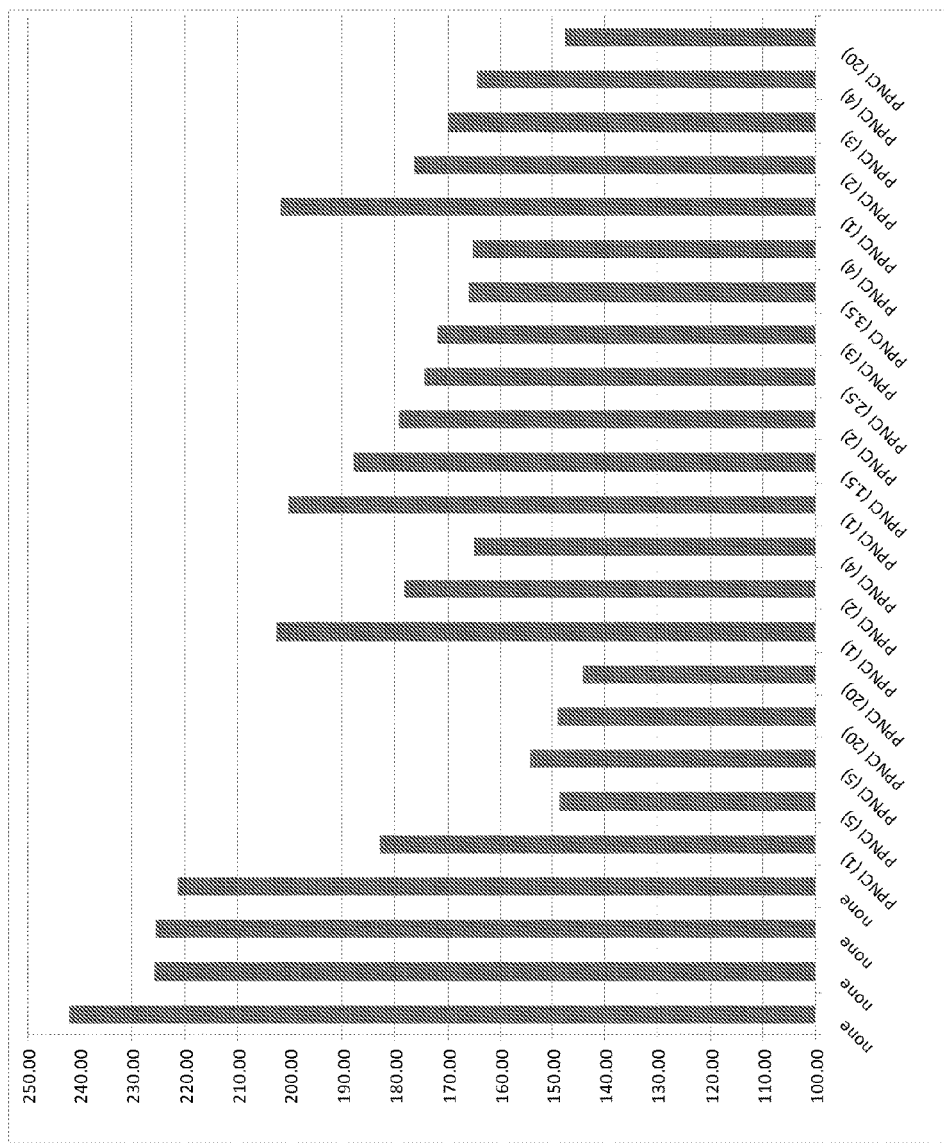
Figure 5C:
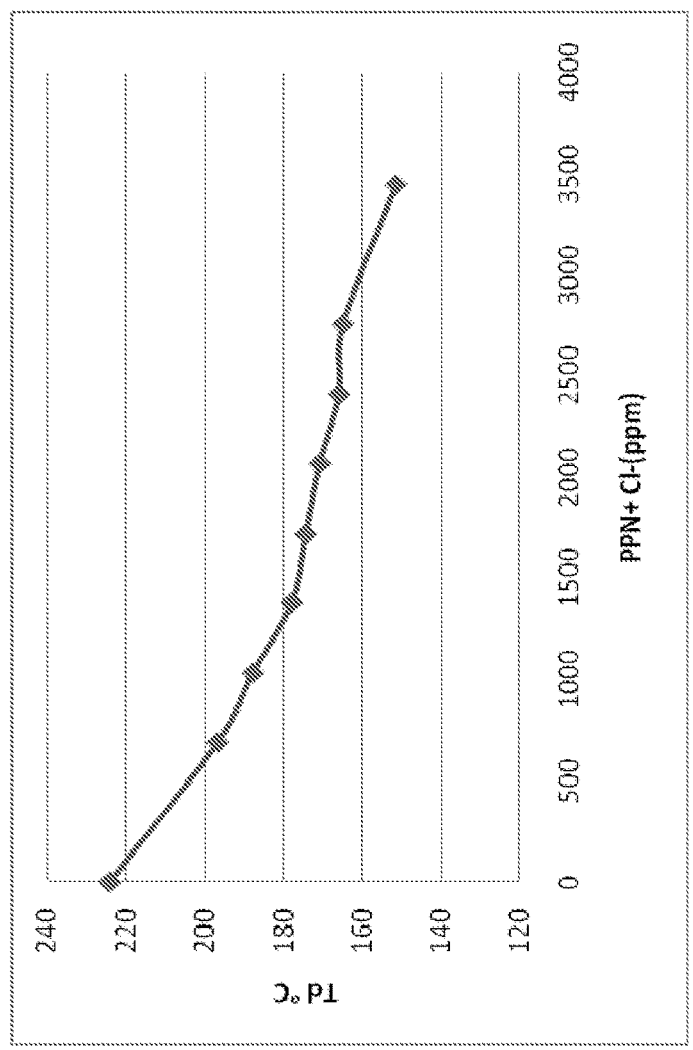
FIG. 5c shows a chart depicting the decrease in onset temperature with increasing concentrations of bis(triphenylphosphoranylidene)ammonium chloride.

Low metal content and a predictable thermal decomposition onset temperature are desirable for some applications of polycarbonates. In particular, where polymers are used as adhesive compositions, binders, or sacrificial materials in methods related to the manufacture and processing of electronic components, the complexity of the processes may dictate that the polymer employed have a specific thermal decomposition onset temperature. Presently, the decomposition onset temperature of polymers available for these applications is primarily determined by the identity of the polymer and is typically in the range of about 220° C. to 350° C. Selection of a polymer for a given application is normally dictated by numerous factors including the ability of the polymer to burnout cleanly, the Tg of the polymer, its solvent compatibility, processability, or resistance to chemical reagents used in material processing, UV transparency, etc. Because of this matrix of factors, it is not possible to select a polymer based only on its thermal decomposition profile. The present invention addresses this issue, for example, by providing a mechanism by which the thermal decomposition onset temperature of a polycarbonate composition can be controlled. This approach provides a much needed feature in sacrificial materials since a polycarbonate composition can be chosen based on any of the other factors listed above, and using methods of the present invention modified to provide a specific burnout temperature optimal for the given process.

Certain techniques presently used to provide highly pure polycarbonates may result in polycarbonate compositions with thermal decomposition onset temperatures above 200° C., and such high onset temperatures may render them unsuitable for certain (e.g., sacrificial) applications. The present invention provides polymer compositions comprising one or more additives that modulate the polymer decomposition temperature. In certain embodiments, polymer compositions have lower decomposition temperatures. In certain embodiments, an additive comprises an organic cation. In certain embodiments, an additive comprises an ammonium cation. In certain embodiments, an additive includes a phosphazene cation. In some embodiments, an additive does not comprise a phosphazene cation. In some embodiments, a polymer composition is substantially free of metals. In some embodiments, a polymer composition is substantially free of transition metals. In some embodiments, a polymer composition is substantially free of cobalt. In certain embodiments, a polymer composition comprises cobalt in an amount less than about 10 ppm.

In some embodiments, a provided polymer composition comprises:

a) a polymer selected from the group consisting of:

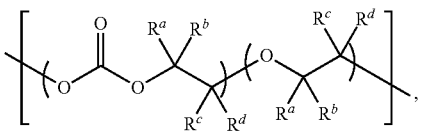

-continued

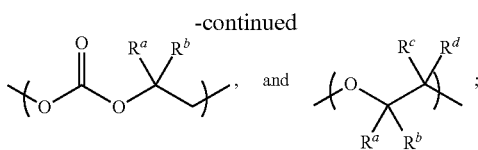

wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with intervening atoms to form one or more optionally substituted rings optionally containing one or more heteroatoms;
and b) an additive characterized in that it modulates the decomposition temperature of the polymer composition.

In certain embodiments, an additive comprises an organic cation. In certain embodiments, an additive includes a phosphonium cation. In certain embodiments, an additive comprises a phosphazene. In certain embodiments, an additive is a quaternary ammonium species. In certain embodiments, an additive comprises a protonated amine species. In certain embodiments, an additive comprises an arsonium species.

In some embodiments, an additive comprises a cation of the formula:

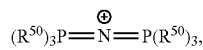

wherein each occurrence of $R^{50}$ is independently an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-2 heteroatoms independently selected from the group consisting of nitrogen, oxygen, and sulfur.

In certain embodiments, $R^{50}$ is optionally substituted $C_{1-20}$ aliphatic. In certain embodiments, $R^{50}$ is optionally substituted $C_{1-8}$ aliphatic. In certain embodiments, $R^{50}$ is optionally substituted 6- to 10-membered aryl. In some embodiments, $R^{50}$ is optionally substituted 6-membered aryl. In some embodiments, $R^{50}$ is optionally substituted phenyl. In some embodiments, $R^{50}$ is other than phenyl.

In some embodiments, an additive is of the formula:

wherein $R^{50}$ is defined as described above and herein.

In certain embodiments, an additive is of the formula:

wherein each occurrence of $R^{51}$ is independently hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; wherein two $R^{51}$ groups can be taken together with their intervening atoms to form one or more optionally substituted rings optionally containing one or more heteroatoms.

In some embodiments, each occurrence of $R^{51}$ is independently hydrogen or an optionally substituted $C_{1-20}$ aliphatic group. In some embodiments, each occurrence of $R^{51}$ is independently hydrogen or an optionally substituted $C_{1-20}$ heteroaliphatic group having 1-4 heteroatoms independently selected from the group consisting of nitrogen, oxygen, and sulfur. In some embodiments, each occurrence of $R^{51}$ is independently hydrogen or an optionally substituted 6- to 10-membered aryl group. In some embodiments, each occurrence of $R^{51}$ is independently hydrogen or an optionally substituted 5- to 10-membered heteroaryl group having 1-4 heteroatoms independently selected from nitrogen, oxygen, or sulfur. In some embodiments, each occurrence of $R^{51}$ is independently hydrogen or an optionally substituted 3- to 7-membered heterocyclic group having 1-2 heteroatoms independently selected from the group consisting of nitrogen, oxygen, and sulfur.

In certain embodiments, each occurrence of $R^{51}$ is hydrogen. In certain embodiments, at least one occurrence of $R^{51}$ is hydrogen. In certain embodiments, at least one occurrence of $R^{51}$ is an optionally substituted $C_{1-20}$ aliphatic group. In certain embodiments, at least one occurrence of $R^{51}$ is an optionally substituted $C_{1-20}$ heteroaliphatic group having 1-4 heteroatoms independently selected from the group consisting of nitrogen, oxygen, and sulfur. In certain embodiments, at least one occurrence of $R^{51}$ is an optionally substituted 6- to 10-membered aryl group. In certain embodiments, at least one occurrence of $R^{51}$ is an optionally substituted 5- to 10-membered heteroaryl group having 1-4 heteroatoms independently selected from nitrogen, oxygen, or sulfur. In certain embodiments, at least one occurrence of $R^{51}$ is an optionally substituted 3- to 7-membered heterocyclic group having 1-2 heteroatoms independently selected from the group consisting of nitrogen, oxygen, and sulfur.

In certain embodiments, each occurrence of $R^{51}$ is an optionally substituted $C_{1-8}$ aliphatic group. In certain embodiments, each occurrence of $R^{51}$ is an optionally substituted $C_{1-6}$ aliphatic group. In some embodiments, each occurrence of $R^{51}$ is methyl, ethyl, propyl, butyl, pentyl, hexyl, heptyl, octyl, or benzyl. In some embodiments, at least one occurrence of $R^{51}$ is perfluoro. In some embodiments, at least one occurrence of $R^{51}$ is —$CF_2CF_3$. In some embodiments, one $R^{51}$ is hydroxyl, thereby forming a substituted hydroxylamine or N-oxide. In certain embodiments, each occurrence of $R^{51}$ is an optionally substituted $C_{1-4}$ aliphatic group. In some embodiments, each occurrence of $R^{51}$ is butyl. In some embodiments, each occurrence of $R^{51}$ is methyl. In some embodiments, each occurrence of $R^{51}$ is ethyl. In some embodiments, each occurrence of $R^{51}$ is propyl. In some embodiments, each occurrence of $R^{51}$ is butyl. In some embodiments, each occurrence of $R^{51}$ is n-butyl.

In some embodiments, two or more $R^{51}$ groups can be taken together with their intervening atoms to form one or more optionally substituted rings selected from the group consisting of: $C_3$-$C_{14}$ carbocycle, $C_3$-$C_{14}$ heterocycle, and $C_6$-$C_{10}$ aryl.

In certain embodiments, an additive comprises a cation of the formula:

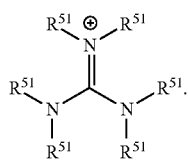

wherein $R^{51}$ is defined as described above and herein.

It will be appreciated that when a guanidinium cation is depicted as

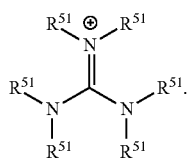

all resonance forms are contemplated and encompassed by the present disclosure. For example, such groups can also be depicted as

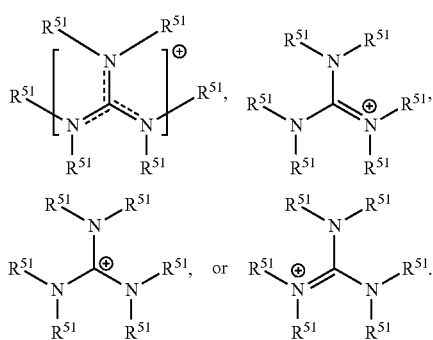

In certain embodiments, an additive comprises a cation of the formula:

wherein $R^{50}$ is as described above and herein. In certain embodiments, each occurrence of $R^{50}$ is n-butyl. In certain embodiments, each occurrence of $R^{50}$ is phenyl.

In certain embodiments, an additive comprises a cation of the formula:

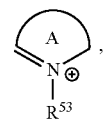

wherein $R^{53}$ is hydrogen, hydroxyl, or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-2 heteroatoms independently selected from the group consisting of nitrogen, oxygen, and sulfur; and Ring A is an optionally substituted, 5- to 10-membered heteroaryl group having 0-3 additional heteroatoms independently selected from nitrogen, oxygen, or sulfur.

In certain embodiments, Ring A is an optionally substituted, 5- to 10-membered heteroaryl group having 0-3 additional heteroatoms independently selected from nitrogen, oxygen, or sulfur. In certain embodiments, Ring A is an optionally substituted, 5- to 10-membered heteroaryl group having 2 nitrogen atoms. In some embodiments, Ring A is an optionally substituted, 5-membered heteroaryl group having 2 nitrogen atoms. In some embodiments, Ring A is an optionally substituted imidazolium group.

In some embodiments, Ring A is an optionally substituted, 6-membered heteroaryl group having 0-2 additional heteroatoms independently selected from nitrogen, oxygen, or sulfur. In some embodiments, Ring A is an optionally substituted pyridinium group.

In some embodiments, $R^{53}$ is hydrogen. In some embodiments, $R^{53}$ is an optionally substituted $C_{1-20}$ aliphatic group. In some embodiments, $R^{53}$ is $C_{1-20}$ heteroaliphatic having 1-4 heteroatoms independently selected from the group consisting of nitrogen, oxygen, and sulfur. In some embodiments, $R^{53}$ is 6- to 10-membered optionally substituted aryl. In some embodiments, $R^{53}$ is optionally substituted 5- to 10-membered heteroaryl having 1-4 heteroatoms independently selected from nitrogen, oxygen, or sulfur. In some embodiments, $R^{53}$ is 3- to 7-membered heterocyclic having 1-2 heteroatoms independently selected from the group consisting of nitrogen, oxygen, and sulfur. In some embodiments, $R^{53}$ is an optionally substituted $C_{1-12}$ aliphatic group. In some embodiments, $R^{53}$ is a $C_{1-6}$ aliphatic group. In some embodiments, $R^{53}$ is neopentyl. In some embodiments, $R^{53}$ is hydroxyl.

In certain embodiments, an additive is an amine. In some embodiments, an additive is an amino alcohol. In some embodiments, an additive is triethanol amine.

In some embodiments, each aforementioned cation is complexed with a suitable anion X. Exemplary anions include, but are not limited to, OH⁻, [O(C=O)Rˣ]⁻, [O(C=O)ORˣ]⁻, CO₃²⁻, HCO₃⁻, CN⁻, N₃⁻, NO₃⁻, SO₄²⁻, ClO₄⁻, halide (e.g., Br⁻, I⁻, Cl⁻, or F⁻), [O(SO₂)Rˣ]ˣ]⁻ wherein each Rˣ is, independently, selected from hydrogen, optionally substituted aliphatic, optionally substituted heteroaliphatic, optionally substituted aryl and optionally substituted heteroaryl.

In certain embodiments, X⁻ is —O(C=O)Rˣ, wherein Rˣ is selected from H, optionally substituted aliphatic, fluorinated aliphatic, optionally substituted heteroaliphatic, optionally substituted aryl, fluorinated aryl, and optionally substituted heteroaryl.

For example, in certain embodiments, X⁻ is —O(C=O)Rˣ, wherein Rˣ is —H or optionally substituted aliphatic. In certain embodiments, X⁻ is —O(C=O)Rˣ, wherein Rˣ is optionally substituted alkyl and fluoroalkyl. In certain embodiments, X⁻ is formate. In certain embodiments, X⁻ is acetate. In certain embodiments, X⁻ is trifluoroacetate. In certain embodiments, X⁻ is or propionate. In certain embodiments, X⁻ is or butyrate. In certain embodiments, X⁻ is or oxalate.

Furthermore, in certain embodiments, X⁻ is —O(C=O)Rˣ, wherein Rˣ is optionally substituted aryl, fluoroaryl, or heteroaryl. In certain embodiments, X⁻ is —O(C=O)Rˣ, wherein Rˣ is optionally substituted aryl. In certain embodiments, X⁻ is —O(C=O)Rˣ, wherein Rˣ is optionally substituted phenyl. In certain embodiments, X⁻ is benzoate or pentafluorobenzoate.

In certain embodiments, X⁻ is —ORˣ, wherein Rˣ is hydrogen or is selected from the group consisting of optionally substituted aliphatic, optionally substituted heteroaliphatic, optionally substituted aryl, and optionally substituted heteroaryl. In some embodiments, X⁻ is hydroxide.

For example, in certain embodiments, X⁻ is —ORˣ, wherein Rˣ is optionally substituted aryl. In certain embodiments, X⁻ is —ORˣ, wherein Rˣ is optionally substituted phenyl. In certain embodiments, X⁻ is —OC₆H₅ or —OC₆H₂ (2,4-NO₂).

In certain embodiments, X⁻ is halide. In certain embodiments, X is Br⁻. In certain embodiments, X is Cl⁻. In certain embodiments, X is I⁻. In certain embodiments, X is F⁻.

In certain embodiments, X⁻ is —O(SO₂)Rˣ. In certain embodiments X⁻ is tosylate. In certain embodiments X⁻ is mesylate. In certain embodiments X is triflate.

In some embodiments, the additive is P⁺(R⁵⁰)₄ X⁻, wherein X⁻ and R⁵⁰ are defined as described above and herein. In some embodiments, the additive is tetraphenylphosphonium chloride.

In certain embodiments, an additive is (R⁵⁰)₃=N⁺=P(R⁵⁰)₃ X⁻, wherein X⁻ and R⁵⁰ are defined as described above and herein. In certain embodiments, an additive is bis(triphenylphosphoranylidene)ammonium chloride. In certain embodiments, an additive is other than bis(triphenylphosphoranylidene)ammonium chloride. In certain embodiments, an additive is bis(triphenylphosphoranylidene)ammonium bromide. In certain embodiments, an additive is bis(triphenylphosphoranylidene)ammonium azide.

In some embodiments, an additive comprises N⁺(R⁵¹)₄ X⁻, wherein X⁻ and R⁵¹ are defined as described above and herein. In some embodiments, the additive comprises a tetraalkyl ammonium carboxylate. In some embodiments, additive is selected from the group consisting of: tetramethylammonium formate, tetramethylammonium acetate, tetramethylammonium trifluoroacteate, tetramethylammonium propionate, tetramethylammonium butyrate, tetramethylammonium benzoate, tetraethylammonium formate, tetraethylammonium acetate, tetraethylammonium trifluoroacteate, tetraethylammonium propionate, tetraethylammonium butyrate, tetraethylammonium benzoate, tetrapropylammonium formate, tetrapropylammonium acetate, tetrapropylammonium trifluoroacteate, tetrapropylammonium propionate, tetrapropylammonium butyrate, tetrapropylammonium benzoate, tetrabutylammonium formate, tetrabutylammonium acetate, tetrabutylammonium trifluoroacteate, tetrabutylammonium propionate, tetrabutylammonium butyrate, tetrabutylammonium benzoate, benzyltrimethylammonium formate, benzyltrimethylammonium acetate, benzyltrimethylammonium trifluoroacteate, decyltrimethylammonium formate, decyltrimethylammonium acetate, decyltrimethylammonium trifluoroacteate, ethyltrimethylammonium formate, ethyltrimethylammonium acetate, ethyltrimethylammonium trifluoroacteate, tetrahexylammonium formate, tetrahexylammonium acetate, tetrahexylammonium trifluoroacteate, tetrapentylammonium formate, tetrapentylammonium acetate, tetrapentylammonium trifluoroacteate, tetrapropylammonium formate, tetrapropylammonium acetate, tetrapropylammonium trifluoroacteate, tributylmethylammonium formate, tributylmethylammonium acetate, tributylmethylammonium trifluoroacteate trimethylphenylammonium formate, trimethylphenylammonium acetate, and trimethylphenylammonium trifluoroacteate.

In some embodiments, an additive is tetrabutylammonium acetate. In some embodiments, an additive is tetrabutylammonium hydroxide. In some embodiments, an additive is tetrabutylammonium bromide. In some embodiments, an additive is tetrabutylammonium azide. In some embodiments, an additive is tetramethylammonium formate. In some embodiments, an additive is tetramethylammonium acetate. In some embodiments, an additive is tetramethylammonium trifluoroacetate. In some embodiments, an additive is tetramethylammonium chloride.

In some embodiments, an additive comprises NH₄⁺X⁻, wherein X⁻ is defined as described above and herein. In some embodiments, an additive is ammonium formate. In some embodiments, an additive is ammonium acetate. In some embodiments, an additive is ammonium propionate.

In some embodiments, an additive is

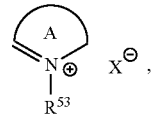

wherein X and R⁵³ are defined as described above and herein. In some embodiments, an additive is butylmethylimidazolium chloride.

As described above, the present invention provides polycarbonate compositions with tunable thermal decomposition onset temperatures. In some embodiments, an additive lowers the decomposition temperature of the polymer composition. It will be appreciated by one of ordinary skill in the art that the choice of additive(s) and/or amount of additive present in the polycarbonate composition may be useful in tuning the decomposition temperature. Accordingly, the choice and/or amount of additive(s) used can be adjusted depending upon a specific end use application.

In certain embodiments, an additive is present at a concentration from about 10 ppm to about 20,000 ppm by weight. In certain embodiments, an additive is present at a concentration from about 10 ppm to about 5,000 ppm by weight. In certain embodiments, an additive is present at a concentration from about 10 ppm to about 3,500 ppm by weight. In certain embodiments, an additive is present at a concentration from about 10 ppm to about 1,500 ppm by weight. In certain embodiments, an additive is present at a concentration from about 10 ppm to about 1,100 ppm by weight. In certain embodiments, an additive is present at a concentration from about 10 ppm to about 100 ppm by weight. In certain embodiments, an additive is present at a concentration from about 100 ppm to about 3,500 ppm by weight. In certain embodiments, an additive is present at a concentration from about 100 ppm to about 1,500 ppm by weight. In certain embodiments, an additive is present at a concentration from about 100 ppm to about 1,100 ppm by weight. In certain embodiments, an additive is present at a concentration from about 500 ppm to about 1,500 ppm by weight.

In certain embodiments, an additive is present at a concentration sufficient to reduce the onset temperature of the composition by about 5° C. to about 75° C. relative to the additive-free polymer. In certain embodiments, an additive is present at a concentration sufficient to reduce the onset temperature of the composition by about 10° C. In certain embodiments, an additive is present at a concentration sufficient to reduce the onset temperature of the composition by about 15° C. In certain embodiments, an additive is present at a concentration sufficient to reduce the onset temperature of the composition by about 20° C. In certain embodiments, an additive is present at a concentration sufficient to reduce the onset temperature of the composition by about 25° C. In certain embodiments, an additive is present at a concentration sufficient to reduce the onset temperature of the composition by about 30° C. In certain embodiments, the additive is present at a concentration sufficient to reduce the onset temperature of the composition by about 40° C. In certain embodiments, the additive is present at a concentration sufficient to reduce the onset temperature of the composition by about 50° C. In certain embodiments, an additive is present at a concentration sufficient to reduce the onset temperature of the composition by about 60° C. In certain embodiments, an additive is present at a concentration sufficient to reduce the onset temperature of the composition by about 70° C.

In certain embodiments, the onset temperature of a provided polymer composition is about 100° C. to about 220° C. In certain embodiments, the onset temperature is about 120° C. to about 200° C. In certain embodiments, the onset temperature is about 120° C. to about 190° C. In certain embodiments, the onset temperature is about 120° C. to about 180° C. In certain embodiments, the onset temperature is about 120° C. to about 170° C. In certain embodiments, the onset temperature is about 120° C. to about 160° C. In certain embodiments, the onset temperature is about 120° C. to about 150° C. In certain embodiments, the onset temperature is about 130° C. to about 150° C. In certain embodiments, the onset temperature is about 140° C. to about 160° C. In certain embodiments, the onset temperature is about 140° C. to about 180° C. In certain embodiments, the onset temperature is about 160° C. to about 180° C. In certain embodiments, the onset temperature is about 175° C. to about 185° C. In certain embodiments, the onset temperature is about 150° C. to about 180° C. In certain embodiments, the onset temperature is about 180° C. to about 200° C.

In some embodiments, provided polymer compositions are substantially free of metals. In some embodiments, provided polymer compositions further comprise a transition metal. In some embodiments, provided polymer compositions are substantially free of transition metals. In certain embodiments, provided polymer compositions comprise transition metals in an amount less than 50 ppm. In certain embodiments, provided polymer compositions comprise transition metals in an amount less than 50 ppm. In certain embodiments, provided polymer compositions comprise transition metals in an amount less than 20 ppm. In certain embodiments, provided polymer compositions comprise transition metals in an amount less than 10 ppm. In certain embodiments, provided polymer compositions comprise transition metals in an amount less than 1 ppm.

In certain embodiments, provided polymer compositions are substantially free of metal ligands and/or cofactors used in the process of preparing the polymer compositions. In certain embodiments, provided polymer compositions are substantially free of cobalt. In certain embodiments, provided polymer compositions comprise cobalt in an amount less than 50 ppm. In certain embodiments, provided polymer compositions comprise cobalt in an amount less than 20 ppm. In certain embodiments, provided polymer compositions comprise cobalt in an amount less than 10 ppm. In certain embodiments, provided polymer compositions comprise cobalt in an amount less than 3 ppm. In some embodiments, when an additive is bis(triphenylphosphoranylidene)ammonium chloride, the polymer composition comprises cobalt in an amount less than 10 ppm.

In some embodiments, provided polymer compositions are substantially free of cyclic carbonates. In some embodiments, provided polymer compositions are substantially free of propylene carbonate.

As described above, it is an object of the present disclosure to provide polycarbonate compositions with tunable decomposition temperatures. This disclosure further provides methods for modulating the decomposition temperatures of such polymer compositions.

In certain embodiments, the present invention provides a method for modulating the decomposition temperature of a polymer composition, the method comprising:
a) providing a polymer composition; and
b) admixing with the polymer composition an effective amount of an additive capable of modulating the decomposition temperature of the polymer composition.

In some embodiments, the method comprises:
a) providing a polymer selected from the group consisting of:

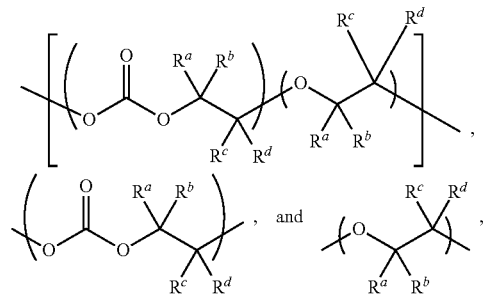

wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with their intervening atoms to form one or more optionally substituted rings; and b) admixing the polymer composition with an effective amount of an additive capable of modulating the decomposition temperature of the polymer composition.

In some embodiments, the method comprises:

a) providing a polymer selected from the group consisting of:

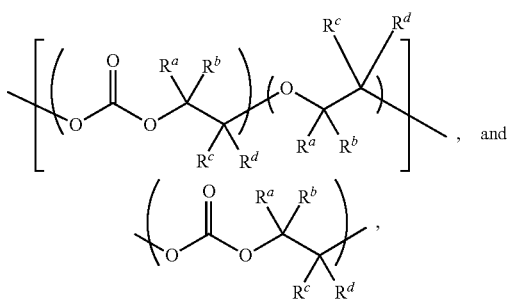

wherein:

each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with their intervening atoms to form one or more optionally substituted rings; and b) admixing the polymer composition with an additive comprising an organic cation in an amount sufficient to modulate the decomposition temperature of the polymer composition.

In some embodiments, an additive is admixed in an amount sufficient to lower the decomposition temperature of the polymer.

In some embodiments, an additive used in step (b) is characterized in that it lowers the decomposition temperature of the resulting polymer composition relative to a polymer composition lacking the additive.

In certain embodiments, methods are characterized in that the provided polymer is substantially free of active metal complex. While not wishing to be bound by any particular theory, it is believed that the presence of active metal complex may result in inconsistent thermal degradation of polymer compositions. In some embodiments, a quenching step is a preliminary or intermediate step to the methods described above. Suitable quenching agents are known in the art and described in detail in PCT Application No. PCT/US09/57324, filed Sep. 17, 2009, and in U.S. Provisional Patent Application No. 61/097,725, filed Sep. 17, 2008 which are incorporated herein by reference. In some embodiments, an active metal complex metal is quenched by addition of a sulfonic acid. In some embodiments, an active metal complex metal is quenched by addition of tosic acid. In some embodiments, an active metal complex metal is quenched by addition of methane sulfonic acid.

In some embodiments, the present invention includes a step of removing a metal complex used in the preparation of a polymer such that a provided polymer composition is substantially free of metal complex. In some embodiments, the metal removal step is a preliminary or intermediate step to the methods described above. Suitable techniques for metal removal are known in the art and described in detail in U.S. Provisional Patent Application No. 61/101,173, filed Sep. 30, 2008, and PCT Application No. PCT/US09/57320, filed Sep. 17, 2009, which are incorporated herein by reference. In some embodiments, a metal is removed by passing a polymer composition over an acidic ion exchange resin. In some embodiments, the resin is Dowex Marathon™ MSC.

Thus, the present invention includes methods of providing polymer compositions that are substantially free of active metal complex. In certain embodiments, polymer compositions are substantially free of transition metals. In certain embodiments, polymer compositions are substantially free of cobalt.

Methods of making polymers useful in the present invention include polymerization in the presence of one or more of the additives described herein. Thus, the present invention includes methods of making polymer compositions comprising an effective amount of an additive capable of modulating the decomposition temperature of the composition, wherein the additive is present during a polymerization reaction.

It will be appreciated that the present invention encompasses methods of tuning the decomposition temperature of any polymer composition described herein. One of ordinary skill, upon reading the present disclosure, will recognize that the present disclosure contemplates such methods using any of the additives, metal complexes, or other reaction conditions described herein.

In some embodiments, the step of the admixing a polymer composition with an effective amount of an additive comprises use of a suitable solvent. Suitable solvents include organic solvents. In certain embodiments, suitable organic solvents include, but are not limited to: hydrocarbons, ethers, alcohols, ketones, esters, aromatic hydrocarbons, chlorinated hydrocarbons, nitriles, and the like. Suitable solvents may include, but are not limited to: acetone, butanone, gamma butyrolactone, ethyl acetate, propyl acetate, butyl acetate, amyl acetate, dichloromethane, chloroform, nitromethane, tetrahydrofuran, and dimethoxyethane, to name but a few. In some embodiments, a solvent is a halogenated hydrocarbon. In certain embodiments, a solvent is supercritical carbon dioxide. In certain embodiments, a solvent is acetone. In certain embodiments, a solvent is propyl acetate. In certain embodiments, methods of the present invention comprise the steps of admixing polymer, solvent and an effective amount of an additive and combining these to provide a homogenous solution. In certain embodiments, methods of the present invention further comprise removing the solvent to provide solid polymer containing an effective amount of the additive.

Methods of the present disclosure may be carried out at any temperature that does not degrade the polymer. In certain embodiments, methods of the present disclosure are carried out at about room temperature. In some embodiments, methods of the present disclosure are carried out at elevated temperatures that reduce the viscosity of the polymer solution and thereby reduce the time and mechanical effort of mixing.

Polymers

In certain embodiments, methods and polymer compositions provided by the present invention comprise or make use of a polymer of the formula:

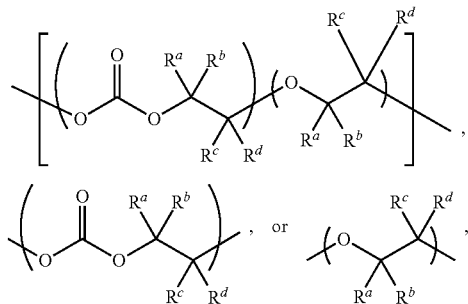

wherein each occurrence of $R^a$, $R^b$, $R^c$, and $R^d$ is defined as described above and herein.

In certain embodiments, methods and polymer compositions provided by the present invention comprise or make use of a polymer of the formula:

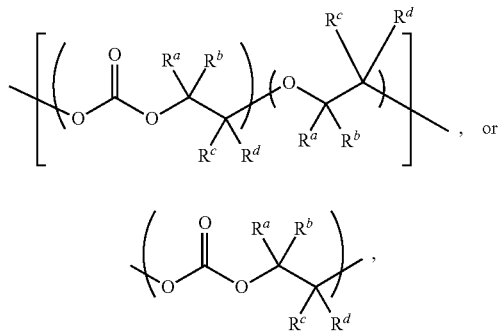

wherein each occurrence of $R^a$, $R^b$, $R^c$, and $R^d$ is as defined and described above and herein.

In certain embodiments, methods and polymer compositions provided by the present invention comprise or make use of a polymer of the formula:

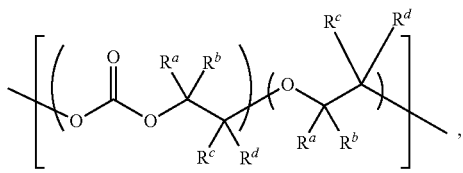

wherein each occurrence of $R^a$, $R^b$, $R^c$, and $R^d$ is defined as described above and herein. In certain embodiments, such polymers have a carbonate-to-ether linkage ratio ranging from about 1:1 to about 99:1 (e.g. between about 50% and about 90% of the linkages are carbonate linkages).

In certain embodiments, a provided polymer comprises a polycarbonate chain. In certain embodiments, methods and polymer compositions provided by the present invention comprise or make use of a polymer comprising a polycarbonate of the formula:

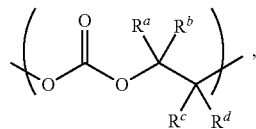

wherein each occurrence of $R^a$, $R^b$, $R^c$, and $R^d$ is defined as described above and herein.

Suitable methods for the synthesis of such polymers are disclosed in Coates et al. (*Angew. Chem. Int. Ed.* 2004, 43, 6618-6639), in U.S. Pat. Nos. 7,304,172, 6,870,004, 3,900,424, and 3,953,383, in U.S. Provisional Patent Application Nos. 61/061,755, filed Jun. 16, 2008, 61/052,061, filed May 9, 2008, and in PCT Application Nos. PCT/US08/73530, filed Aug. 18, 2008, and PCT/US2009/054773, filed Aug. 24, 2009, all of which are incorporated herein in their entirety.

In certain embodiments, a provided polymer composition comprises a copolymer of a $C_2$-$C_{12}$ epoxide and carbon dioxide. For example, the polymer can comprise a copolymer of carbon dioxide and one or more epoxides such as, but not limited to: ethylene oxide, propylene oxide, 1,2-butene oxide, 2,3-butene oxide, butadiene monoepoxide, 1,2-pentene oxide, epichlorohyrin, 1,2-epoxy-2-methylpropane, glycidyl ether, glycidyl ester, 1,2-hexene oxide, $C_{7-30}$ alpha olefin epoxide, cyclopentene oxide, cyclohexene oxide, 4-vinyl cyclohexene oxide, 4-ethyl cyclohexene oxide, styrene oxide, limonene oxide, norbornene oxide, cyclooctene oxide, 1,2,5,6-diepoxycyclooctane, and cyclooctadiene monoepoxide.

For example, a provided polymer composition can comprise a copolymer of propylene oxide, and carbon dioxide. In some embodiments, a provided polymer composition comprises a copolymer of ethylene oxide and carbon dioxide. In some embodiments, a provided polymer composition comprises a copolymer of cyclohexene oxide and carbon dioxide. In some embodiments, a provided polymer composition comprises a copolymer of butylene oxide and carbon dioxide. In some embodiments, a provided polymer composition comprises a copolymer of butylene oxide and carbon dioxide. In some embodiments, a provided polymer composition comprises a copolymer of 1,2-hexene oxide and carbon dioxide. In some embodiments, a provided polymer composition comprises a copolymer of cyclopentene oxide and carbon dioxide. In some embodiments, a provided polymer composition comprises a copolymer of norbornene oxide and carbon dioxide. In some embodiments, a provided polymer composition comprises a copolymer of 3-vinyl-cyclohexene oxide and carbon dioxide. In some embodiments, a provided polymer composition comprises a copolymer of limonene oxide and carbon dioxide. In some embodiments, a provided polymer composition comprises a copolymer of epichlorohydrin and carbon dioxide.

In certain embodiments, a provided polycarbonate comprises poly(propylene carbonate) (PPC). In certain embodiments, a provided poly(propylene carbonate) is characterized in that it has an average molecular weight between about 1,000 and about 500,000 g/mol. In certain embodiments, a provided poly(propylene carbonate) has a molecular weight between about 10,000 and about 400,000 g/mol. In certain embodiments, a provided poly(propylene carbonate) has a molecular weight between about 20,000 and about 300,000 g/mol. In certain embodiments, a provided poly(propylene carbonate) has a molecular weight between about 50,000 and about 250,000 g/mol. In certain embodiments, a provided poly(propylene carbonate) has a molecular weight between about 50,000 and about 200,000 g/mol.

In certain embodiments, a provided poly(propylene carbonate) composition is characterized in that, on average in the composition, at least 60% of adjacent repeat units in the poly(propylene carbonate) have head-to-tail regiochemistry. In certain embodiments, a provided poly(propylene carbonate) composition has at least 70% head-to-tail regiochemistry. In certain embodiments, a provided poly(propylene carbonate) composition has greater than 80% head-to-tail regiochemistry. In certain embodiments, a provided poly(propylene carbonate) composition has greater than 85%, greater than 90%, greater than 95%, greater than 97%, or greater than 99% head-to-tail regiochemistry.

In certain embodiments, a provided poly(propylene carbonate) composition is characterized in that it has a narrow polydispersity index (PDI). In certain embodiments, a provided poly(propylene carbonate) has a PDI less than 4. In certain embodiments, a provided poly(propylene carbonate) has a PDI less than 3. In certain embodiments, a provided poly(propylene carbonate) has a PDI less than 2. In certain embodiments, a provided poly(propylene carbonate) has a PDI less than 1.8. In certain embodiments, a provided poly(propylene carbonate) has a PDI less than 1.5. In certain embodiments, a provided poly(propylene carbonate) has a PDI less than 1.2.

In certain embodiments, a provided poly(propylene carbonate) composition is characterized in that it has a low content of cyclic carbonate. In certain embodiments, a provided poly(propylene carbonate) has a propylene carbonate content of less than 5 wt %. In certain embodiments, a provided poly(propylene carbonate) has a propylene carbonate content of less than 4 wt %. In certain embodiments, a provided poly(propylene carbonate) has a propylene carbonate content of less than 3 wt %. In certain embodiments, a provided poly(propylene carbonate) has a propylene carbonate content of less than 2 wt %. In certain embodiments, a provided poly(propylene carbonate) has a propylene carbonate content of less than 1 wt %. In certain embodiments, a provided poly(propylene carbonate) has a propylene carbonate content of less than 0.5 wt %. In certain embodiments, a provided poly(propylene carbonate) has a propylene carbonate content of less than 0.1 wt %.

In certain embodiments, a provided polycarbonate composition comprises poly(ethylene carbonate) (PEC). In certain embodiments, a provided polycarbonate composition comprises poly(butylene carbonate) (PBC). In certain embodiments, a provided polycarbonate composition comprises poly(cyclohexene carbonate) (PCHC). In certain embodiments, a provided polycarbonate composition comprises poly(limonene carbonate) (PLC). In certain embodiments, a provided polycarbonate composition comprises poly(norbornene carbonate) (PNC).

In certain embodiments, a provided polymer is a copolymer of two or more $C_2$-$C_{12}$ epoxides and carbon dioxide. In some embodiments a provided polymer is a terpolymer of propylene oxide, cyclohexene oxide and carbon dioxide. In some embodiments, a provided polymer is a terpolymer of ethylene oxide, propylene oxide and carbon dioxide. In some embodiments, a provided polymer is a terpolymer of ethylene oxide, cyclohexene oxide and carbon dioxide. In some embodiments, a provided polymer is a terpolymer of ethylene oxide, butylene oxide and carbon dioxide. In some embodiments, a provided polymer is a terpolymer of butylene oxide, propylene oxide and carbon dioxide. In some embodiments, a provided polymer is a terpolymer of cyclohexene oxide, butylene oxide and carbon dioxide. In some embodiments, a provided polymer is a terpolymer of norbornene oxide, propylene oxide and carbon dioxide. In some embodiments, a provided polymer is a terpolymer of propylene oxide, limonene oxide and carbon dioxide.

In some embodiments, a polymer is a heteropolymer of three or more $C_2$ to $C_{12}$ epoxides and carbon dioxide. In some embodiments, a polymer is a heteropolymer of any three or more of the epoxides described above and carbon dioxide.

In certain embodiments, a polymer is a block co-polymer of two or more of any of the above-described compositions.

In certain embodiments, polymers include ether linkages. Polymers in these embodiments can be mixed polyether polycarbonates, pure polyethers or block copolymers of two or more of these.

In certain embodiments of the polymer compositions described above, a polymer is substantially:

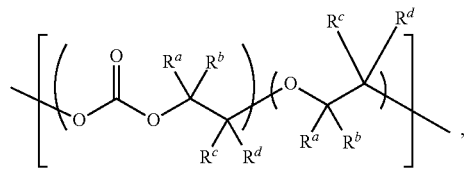

wherein each occurrence of $R^a$, $R^b$, $R^c$, and $R^d$ is defined as described above.

Suitable methods for synthesizing such polyethers are disclosed in U.S. Pat. No. 7,399,822, the entire content of which is incorporated herein by reference.

In certain embodiments of the polymer compositions described above, a polymer is substantially:

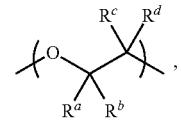

wherein each occurrence of $R^a$, $R^b$, $R^c$, and $R^d$ is defined as described above.

In some embodiments of the polymer compositions described above, $R^a$ is hydrogen. In certain embodiments, $R^b$, $R^c$, and $R^d$ are each hydrogen. In certain embodiments, one of $R^a$, $R^b$, $R^c$, and $R^d$ is hydrogen. In certain embodiments, two of $R^a$, $R^b$, $R^c$, and $R^d$ are hydrogen. In certain embodiments, three of $R^a$, $R^b$, $R^c$, and $R^d$ are hydrogen.

In certain embodiments, $R^a$ is hydrogen. In certain embodiments, $R^b$ is hydrogen. In certain embodiments, $R^c$ is hydrogen. In certain embodiments, $R^d$ is hydrogen.

In certain embodiments, $R^a$ is an optionally substituted $C_{1-30}$ aliphatic group. In certain embodiments, $R^b$ is an optionally substituted $C_{1-30}$ aliphatic group. In certain embodiments, $R^c$ is an optionally substituted $C_{1-30}$ aliphatic group. In certain embodiments, $R^d$ is an optionally substituted $C_{1-30}$ aliphatic group.

In some embodiments, $R^a$ is optionally substituted $C_{1-12}$ aliphatic. In some embodiments, $R^a$ is optionally substituted $C_{1-12}$ heteroaliphatic having 1-4 heteroatoms independently selected from the group consisting of nitrogen, oxygen, and sulfur. In some embodiments, $R^a$ is optionally substituted 6- to 10-membered aryl. In some embodiments, $R^a$ is optionally substituted 5- to 10-membered heteroaryl having 1-4 heteroatoms independently selected from nitrogen, oxygen, or sulfur. In some embodiments, $R^a$ is optionally substituted 3- to 7-membered heterocyclic having 1-2 heteroatoms independently selected from the group consisting of nitrogen, oxygen, and sulfur.

In certain embodiments, each occurrence of $R^a$ is independently selected from methyl, ethyl, propyl, butyl, vinyl, allyl, phenyl, chloromethyl, trifluoromethyl,

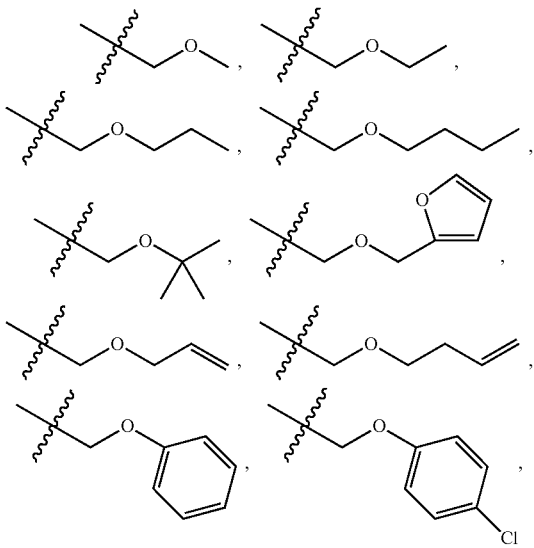

or any two or more of the above. In certain embodiments, $R^a$ is methyl. In certain embodiments, $R^a$ is ethyl. In certain embodiments, $R^a$ is propyl. In certain embodiments, $R^a$ is butyl. In certain embodiments, $R^a$ is vinyl. In certain embodiments, $R^a$ is allyl. In certain embodiments, $R^a$ is phenyl. In certain embodiments, $R^a$ is trifluoromethyl.

In some embodiments, $R^b$ is hydrogen. In some embodiments, $R^b$ is optionally substituted $C_{1-12}$ aliphatic. In some embodiments, $R^b$ is optionally substituted $C_{1-12}$ heteroaliphatic having 1-4 heteroatoms independently selected from the group consisting of nitrogen, oxygen, and sulfur. In some embodiments, $R^b$ is optionally substituted 6- to 10-membered aryl. In some embodiments, $R^b$ is optionally substituted 5- to 10-membered heteroaryl having 1-4 heteroatoms independently selected from nitrogen, oxygen, or sulfur. In some embodiments, $R^b$ is optionally substituted 3- to 7-membered heterocyclic having 1-2 heteroatoms independently selected from the group consisting of nitrogen, oxygen, and sulfur.

In some embodiments, $R^c$ is hydrogen. In some embodiments, $R^c$ is optionally substituted $C_{1-12}$ aliphatic. In some embodiments, $R^c$ is optionally substituted $C_{1-12}$ heteroaliphatic having 1-4 heteroatoms independently selected from the group consisting of nitrogen, oxygen, and sulfur. In some embodiments, $R^c$ is optionally substituted 6- to 10-membered aryl. In some embodiments, $R^c$ is optionally substituted 5- to 10-membered heteroaryl having 1-4 heteroatoms independently selected from nitrogen, oxygen, or sulfur. In some embodiments, $R^c$ is optionally substituted 3- to 7-membered heterocyclic having 1-2 heteroatoms independently selected from the group consisting of nitrogen, oxygen, and sulfur.

In some embodiments, $R^d$ is hydrogen. In some embodiments, $R^d$ is optionally substituted $C_{1-12}$ aliphatic. In some embodiments, $R^d$ is optionally substituted $C_{1-12}$ heteroaliphatic having 1-4 heteroatoms independently selected from the group consisting of nitrogen, oxygen, and sulfur. In some embodiments, $R^d$ is optionally substituted 6- to 10-membered aryl. In some embodiments, $R^d$ is optionally substituted 5- to 10-membered heteroaryl having 1-4 heteroatoms independently selected from nitrogen, oxygen, or sulfur. In some embodiments, $R^d$ is optionally substituted 3- to 7-membered heterocyclic having 1-2 heteroatoms independently selected from the group consisting of nitrogen, oxygen, and sulfur.

In some embodiments, $R^a$ and $R^c$ are taken together with their intervening atoms to form one or more rings selected from the group consisting of: optionally substituted $C_3$-$C_{14}$ carbocycle and optionally substituted $C_3$-$C_{14}$ heterocycle. In some embodiments, $R^a$ and $R^c$ are taken together with their intervening atoms to form one or more optionally substituted $C_3$-$C_{14}$ carbocycle rings. In some embodiments, $R^a$ and $R^c$ attached to adjacent carbons are taken together to form a six-membered carbocyclic ring. In some embodiments, $R^a$ and $R^c$ attached to adjacent carbons are taken together to form a cyclohexene ring.

In some embodiments, $R^b$ and $R^c$ are taken together with their intervening atoms to form one or more rings selected from the group consisting of: optionally substituted $C_3$-$C_{14}$ carbocycle and optionally substituted $C_3$-$C_{14}$ heterocycle.

In some embodiments, $R^a$ and $R^b$ are taken together with their intervening atoms to form one or more rings selected from the group consisting of: optionally substituted $C_3$-$C_{14}$ carbocycle and optionally substituted $C_3$-$C_{14}$ heterocycle.

In certain embodiments, a polymer comprises a copolymer of two different repeating units where $R^a$, $R^b$, and $R^c$ of the two different repeating units are not all the same. In some embodiments, a polymer comprises a copolymer of three or more different repeating units wherein $R^a$, $R^b$, and $R^c$ of each of the different repeating units are not all the same as $R^a$, $R^b$, and $R^c$ of any of the other different repeating units. In some embodiments, a polymer is a random copolymer. In some embodiments, a polymer is a tapered copolymer.

In some embodiments, a polymer contains a metal complex as described herein. In some embodiments, a polymer residue of a metal complex as described herein. In some embodiments, a polymer contains a salt of an organic cation and $X^-$, wherein $X^-$ is a counterion. In some embodiments, $X^-$ is a 2,4-dinitrophenolate anion.

In some embodiments, the step of providing a polymer composition comprises:

a) providing an epoxide of formula:

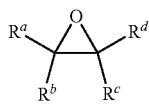

wherein:
R$^a$ is hydrogen or an optionally substituted group selected from the group consisting of C$_{1-30}$ aliphatic; C$_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each of R$^b$, R$^c$, and R$^d$ is independently hydrogen or an optionally substituted group selected from the group consisting of C$_{1-12}$ aliphatic; C$_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of (R$^a$ and R$^c$), (R$^c$ and R$^d$), and (R$^a$ and R$^b$) can be taken together with their intervening atoms to form one or more optionally substituted rings; and b) contacting the epoxide and carbon dioxide in the presence of a suitable catalyst, to provide the polymer composition.

As described above and herein, the present invention includes methods for synthesizing polymers using a suitable metal complex. In certain embodiments, the metal complexes have utility in the synthesis of aliphatic polycarbonates via copolymerization of epoxides and carbon dioxide. In certain embodiments, the metal complexes have utility in the synthesis of polyethers through the polymerization of epoxides.

Applications

It is well known in the art that APCs may be used in the manufacture of consumer goods such as materials for food packaging, electronics, packaging for consumer goods, and polymeric reagents. In particular, APCs having a low metal content and a thermal decomposition onset temperature of about 260° C. or lower are useful in a variety of sacrificial applications.

In some embodiments, polymer compositions of the present invention may be used as temporary adhesives in the manufacture of semiconductor wafers and flexible electronic assemblies. Using temporary adhesives to attach a wafer or flexible substrate to a rigid carrier wafer offers an efficient solution. Requirements for such adhesive materials include ease of application, coating uniformity with minimal thickness variation across the wafer, good adhesion to a wide variety of surfaces, thermal stability in processes such as dielectric deposition and metallization, and ease of removal to allow high throughput. An additional requirement for these materials is stability in harsh chemical environments posed by processes such as etching and electroplating. Aliphatic polycarbonates (APCs) meet many of these requirements and their use for these applications has been described. In particular poly(propylene carbonate) (PPC) has been explored as a temporary adhesive in wafer processing methods. These methods are described, for example, in US Patent Application Publication No. 20070000595, International Patent Application Publication No. WO 2008/005979, and International Patent Application No. PCT/US09/65528, filed Nov. 23, 2009.

In some embodiments, polymer compositions of the present invention may be used in the fabrication of MEMS (microelectromechanical-system) devices (Jayachandran, J. P. et al., supra). Wu et al. has described microchannel fabrication using polynorbornene copolymer based sacrificial materials (Wu, X. et al., J. Electrochem. Soc., Vol. 150, 2003, pp. H205-H213).

In certain embodiments, polymer compositions of the present invention may be used in photolithography, electroplating, formation of sealed microchannels, release of free-standing microstructures, microembossing, and high-aspect-ratio-microstructurs (Lu, C. et al., Polymer Engineering and Science, June 2007).

In certain embodiments, polymer compositions of the present invention may be used in the manufacture of nanofluidic channels and nanoimprinting lithography (Li, W. et al., Nanotechnology, 14, 2005, pp. 1-6).

The ability to tune the precise decomposition temperature of polymer compositions of the present invention can be particularly useful for the above-described applications because, among other things, they present the artisan with the option of choosing polymers that can be removed at relatively low temperatures. These mild conditions enable additional methods since they can be performed in the presence of thermally unstable features that might be damaged by methods using un-modified polymers having higher decomposition onset temperatures.

Polymer compositions of the present invention also enable processes using several sacrificial polymers with different onset temperatures in the same manufacturing process. In such cases methods can include the removal of a feature made from polymer with a depressed onset temperature in the presence of one or more polymers having a higher onset temperature. In some methods, these materials may comprise the same polycarbonate polymer containing differing amounts of the additives.

One of ordinary skill in the art will be knowledgeable of the techniques of manufacturing such materials and goods once provided with the polymers, additives, and methods of the present disclosure. In some embodiments, a material is oil resistant. In some embodiments, a material is a film. In some embodiments, a material is extruded. In some embodiments, a material is thermoformed.

EXAMPLES

Example 1

Effects of Selected Agents on PPC Thermal Degradation

A sampling of additives, added as dilute acetone solutions of PPC (quenched with PTSA, solvent exchanged into acetone and pumped through a column of hydrogen form Dowex Marathon® MSC) were examined by TGA. The additives to be tested were prepared as 0.12 mM stock solutions in acetone. 1 mL of additive solution was then combined with 100 mg of PPC (667 mg of 15% acetone solution in). The well-mixed solutions were then dried, either in air or in a vacuum oven, and analyzed by TGA.

From FIGS. 1a-c, it can be seen that many additives which were examined had little effect on the onset of decomposition temperature at these concentrations. The principle exceptions were PPNCl and tetrabutylammonium acetate, both of which were studied in greater detail (see ensuing Examples). Higher concentration samples of tetrabutylammonium acetate (5 and 20 equivalents) decomposed during the drying step in the vacuum oven (temperature unknown). Subsequent sample preparations relied on overnight air drying in a fume hood. Although PPNCl was determined to have a significant effect on the onset temperature, a halide free additive was also sought since halogen impurities can be detrimental in certain electronics processing steps. It was also found that, gram for gram, tetrabutylammonium acetate produces a greater reduction in the onset temperature than PPNCl.

Ammonium hydroxide lowered the decomposition temperature, but also reacted with the acetone solvent and appeared to completely degrade the polymer at higher concentrations and was not further investigated.

A number of additive treated samples, including several of the tetrabutylammonium acetate treated ones, were submitted for GPC molecular weight analysis and were found to be unchanged from the untreated material (see, for example FIGS. 3a, 5a, 6a, and 7a).

The results of these experiments suggest that the addition of tetrabutylammonium acetate to clean PPC solution is an effective method of reducing the onset of decomposition temperature of PPC to any desired value from around 140° C. to the intrinsic onset temperature.

Example 2

Effects of Tetrabutylammonium Acetate on PPC Thermal Degradation 667 mg of 15% by weight PPC in acetone solution was placed in a 20 mL scintillation vial, allowed to air dry overnight and analyzed by TGA (thermogravimetric analysis). The TGA results indicated an onset of thermal degradation temperature of 225.33° C. (see FIGS. 1a and 1b, "none").

A solution containing 36.2 mg of tetrabutylammonium acetate in 1 L of acetone was prepared. The resulting solution was used in the experiments described below. The amount of solution used is indicated parenthetically in FIGS. 1a and 1b.

1.00 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and the residue analyzed by TGA. The TGA results indicated an onset of thermal degradation temperature of 213.45° C. (see FIGS. 1a and 1b).

1.25 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 203.09° C.

1.50 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 181.20° C.

1.75 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 167.58° C.

2.00 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 148.83° C.

2.50 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 145.87° C.

3.00 mL of the tetrabutylammonium acetate solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 139.76° C.

Example 3

Effects of bis(triphenylphosphoranylidene)ammonium chloride (PPNCl) on PPC thermal degradation A solution containing 68.9 mg of bis(triphenylphosphoranylidene)ammonium chloride in 1 L of acetone was prepared. The resulting solution was used in the experiments described below. The amount of solution used is indicated parenthetically in FIGS. 1a and 1b.

1.00 mL of the bis(triphenylphosphoranylidene)ammonium chloride solution was combined with 667 mg of a 15% solution of PPC (100.0 mg, as described above) in acetone in a 20 mL scintillation vial. The sample was mixed by shaking the vial, allowed to air dry overnight and analyzed by TGA. The TGA results indicated an onset of thermal degradation temperature of 200.21° C. (see FIGS. 1a and 1b).

1.50 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 187.75° C.

2.00 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 179.31° C.

2.50 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 174.31° C.

3.00 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 171.86° C.

3.50 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 165.90° C.

4.00 mL of the bis(triphenylphosphoranylidene)ammonium chloride solution was combined with 667 mg of a 15% solution of PPC (100.0 mg) in acetone in a 20 mL scintillation vial. The sample was mixed by shaking the vial, allowed to air dry overnight and analyzed by TGA. The TGA results indicated an onset of thermal degradation temperature of 165.31° C.

In a similar fashion, butylmethylimidazolium chloride was tested for effects on PPC thermal degradation (see FIGS. 1a and 1b).

Figure 6B:
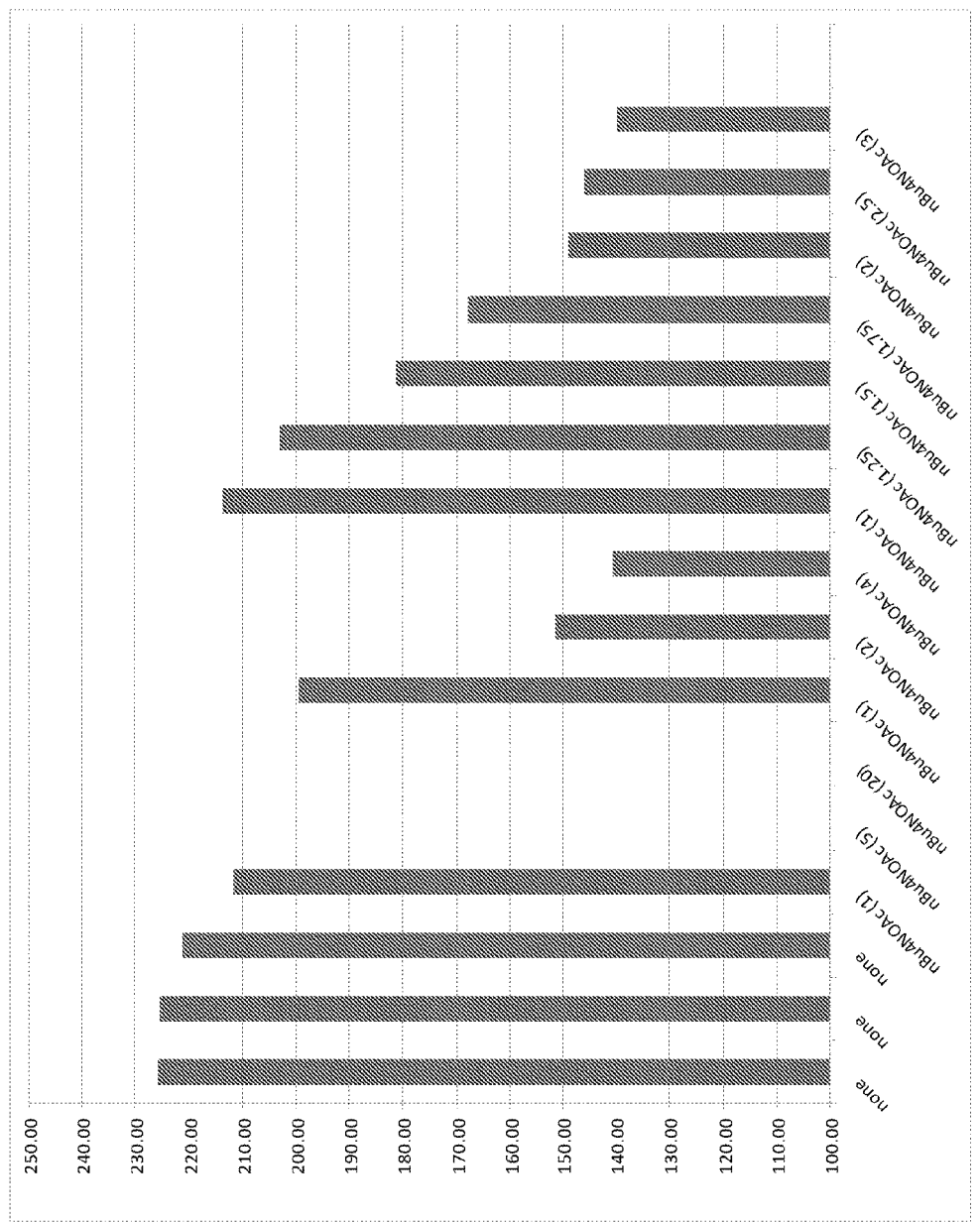
Figure 6C:
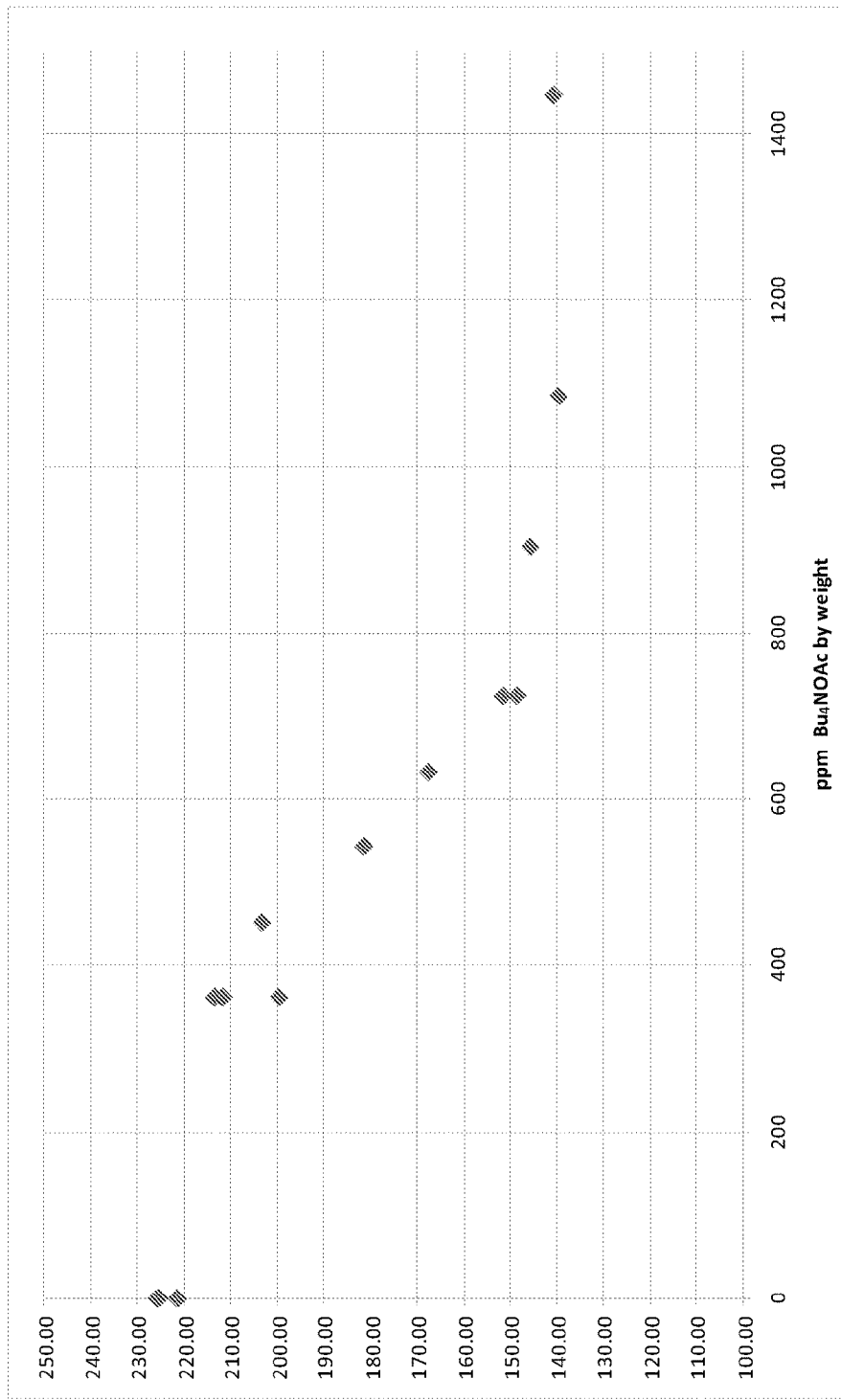

The results of additional experiments with tetrabutylammonium acetate are shown in FIGS. 2a-b and 6a-b. FIG. 6c shows a plot of onset temperature vs. equivalents of tetrabutylammonium acetate from which it can be seen that the onset temperature lowering effect changes rapidly between one and two equivalents and appears to reach a maximum at about three equivalents (i.e., the onset temperature reaches a minimum of around 140° C.). More importantly, the range of achievable onset temperatures encompasses the desired 180° C.

The results of additional experiments with bis(triphenylphosphoranylidene)ammonium salts are shown in FIGS. 3a-b, 4a-b, 5a-e.

Figure 6D:
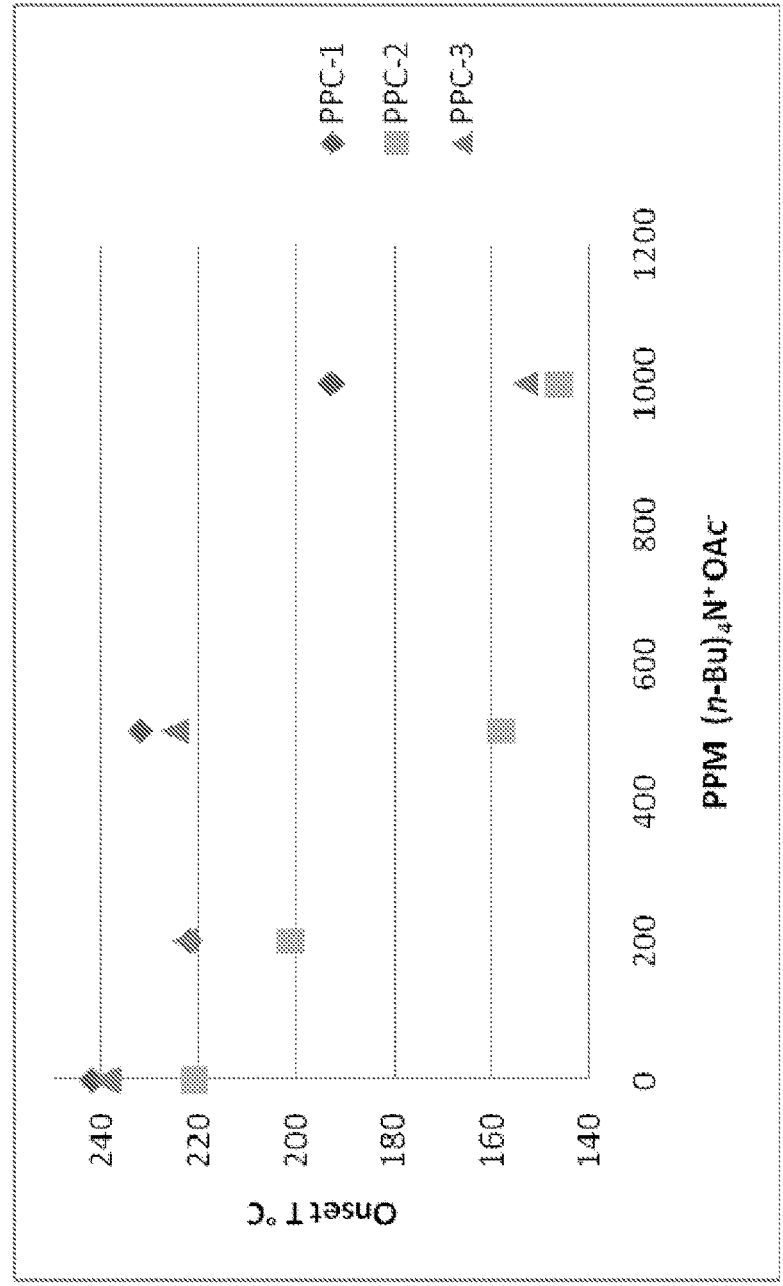
FIG. 6d shows a chart depicting the decrease in onset temperature for three different samples of PPC.

The generality of methods for lowering the decomposition temperature of PPC made using different conditions and/or having different molecular weights was also assessed. As shown in FIG. 6d, three different samples of PPC were treated with tetra-n-butylammonium acetate at levels of 0, 200, 500, and 1000 ppm. PPC-1 is high molecular weight PPC having Mn of 169,000 g/mol and a PDI of 1.14 made with a cobalt salen catalyst according to conditions disclosed in U.S. Pat. No. 7,304,172. PPC-2 is commercially available PPC (QPAC-40™, Mn=114,854, PDI=2.33) made with a heterogenous zinc catalyst. PPC-3 is a polycarbonate polyol having Mn of 2,600 g/mol and a PDI of 1.04. In each case, the onset temperature was depressed by the additive in a concentration dependent fashion.

Example 4

Figure 7B:
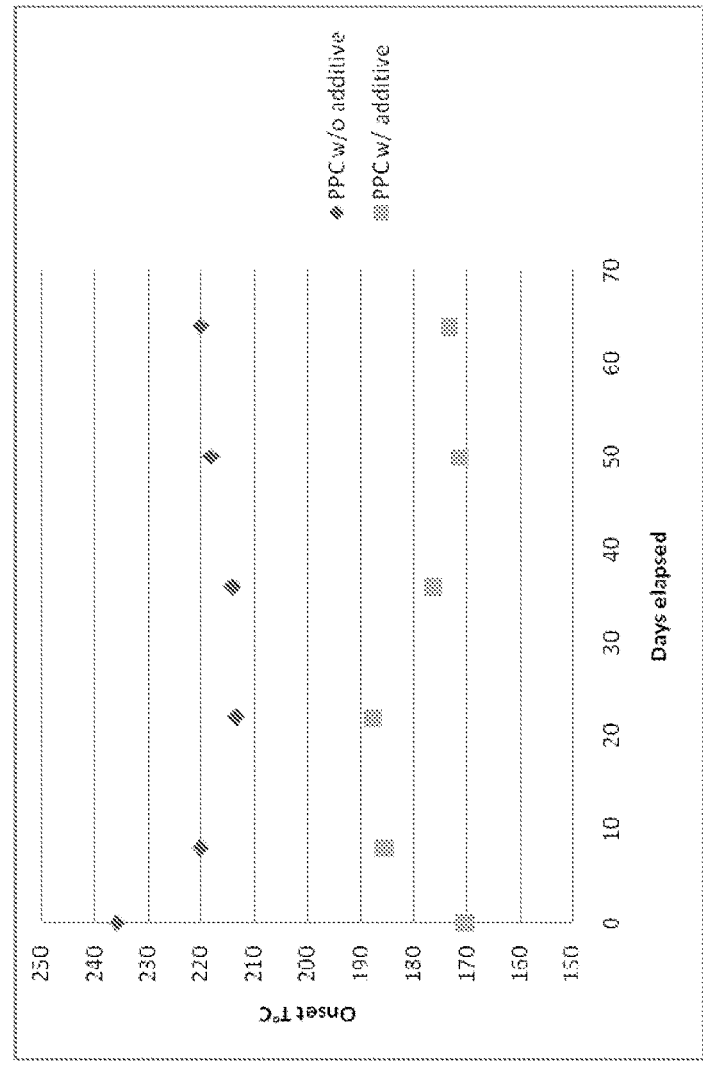
Figure 7C:
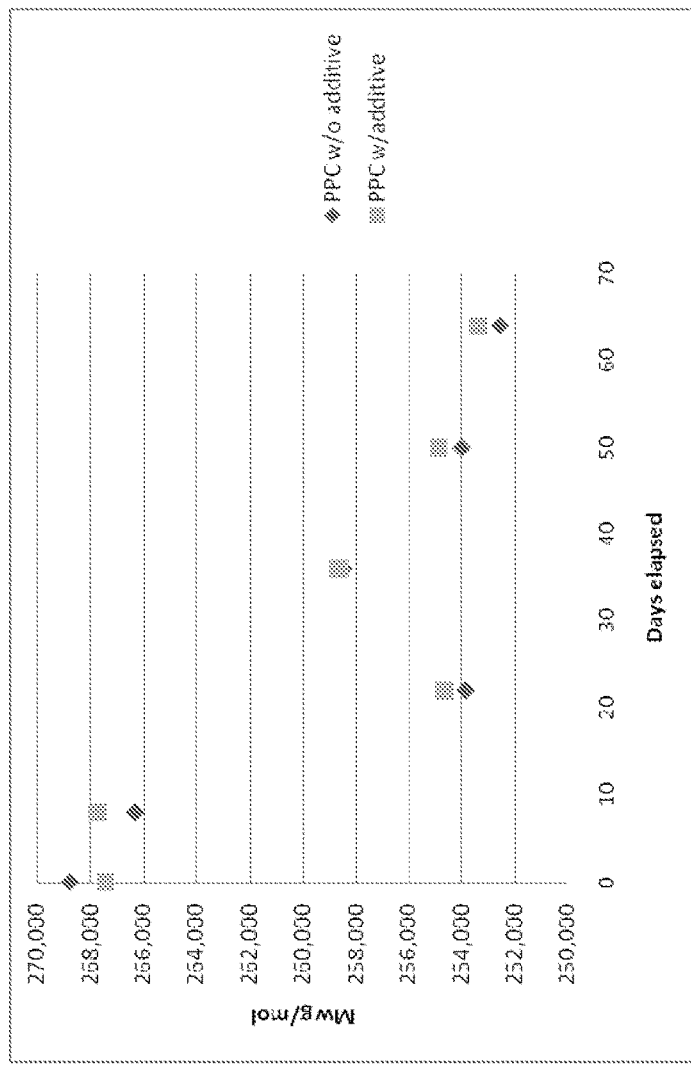

FIGS. 7a-7c depict a long-term stability study of a PPC composition treated with tetrabutylammonium acetate. The compositions were prepared as solutions and followed over time to determine the effect (if any) of the additive on long term stability of the solutions. The x-axis (FIGS. 7b-c) is the age of the solution in days. The y-axis is either onset of thermal decomposition temperature (° C., FIG. 7b) or average molecular weight (FIG. 7c). The legends refer to either untreated control (PPC w/o additive) or PPC containing 543 ppm tetrabutylammonium acetate (PPC w/additive).

Example 5

A polymer solution was prepared from 15 grams of poly(propylene carbonate) ($M_w$=190,000) and 85 grams of acetone. Solutions were prepared by dissolving 0.24 mmol of compound in 20 mL of acetone (tri-n-butylamine, tetra-n-butylammonium methylcarbonate) or methanol (ammonium formate, ammonium acetate) and then diluting 0.20 mL of those solutions to 20 mL with acetone to give $1.2 \times 10^{-4}$ M solutions. Samples were prepared by combining 0.67 g of polymer solution with 0, 1, 2, 4, 8 or 16 mL of compound solution, mixing well and allowing to air dry for three days. The samples were analyzed by TGA. The decomposition onset data for these samples are summarized in Table 1.

TABLE 1

| Sample # | PPC g | Compound | MWt g/mol | Amount mL | Amount mol | Amount ppm | Onset T ° C. |
|---|---|---|---|---|---|---|---|
| 7-1 | 0.10 | none | n/a | n/a | n/a | n/a | 231 |
| 7-2 | 0.10 | $^nBu_3N$ | 185.35 | 1 | 1.20E-07 | 222 | 238 |
| 7-3 | 0.10 | $^nBu_3N$ | 185.35 | 2 | 2.40E-07 | 445 | 235 |
| 7-4 | 0.10 | $^nBu_3N$ | 185.35 | 4 | 4.80E-07 | 890 | 239 |
| 7-5 | 0.10 | $^nBu_3N$ | 185.35 | 8 | 9.60E-07 | 1779 | 239 |
| 7-6 | 0.10 | $^nBu_3N$ | 185.35 | 16 | 1.92E-06 | 3559 | 239 |
| 7-7 | 0.10 | $^nBu_4N$ $O_2COMe$ | 317.51 | 1 | 1.20E-07 | 381 | 229 |
| 7-8 | 0.10 | $^nBu_4N$ $O_2COMe$ | 317.51 | 2 | 2.40E-07 | 762 | 161 |
| 7-9 | 0.10 | $^nBu_4N$ $O_2COMe$ | 317.51 | 4 | 4.80E-07 | 1524 | 137 |
| 7-10 | 0.10 | $^nBu_4N$ $O_2COMe$ | 317.51 | 8 | 9.60E-07 | 3048 | 131 |
| 7-11 | 0.10 | $^nBu_4N$ $O_2COMe$ | 317.51 | 16 | 1.92E-06 | 6096 | 111 |
| 7-12 | 0.10 | $NH_4$ $O_2CH$ | 63.06 | 1 | 1.20E-07 | 76 | 231 |
| 7-13 | 0.10 | $NH_4$ $O_2CH$ | 63.06 | 2 | 2.40E-07 | 151 | 230 |
| 7-14 | 0.10 | $NH_4$ $O_2CH$ | 63.06 | 4 | 4.80E-07 | 303 | 229 |
| 7-15 | 0.10 | $NH_4$ $O_2CH$ | 63.06 | 8 | 9.60E-07 | 605 | 226 |
| 7-16 | 0.10 | $NH_4$ $O_2CH$ | 63.06 | 16 | 1.92E-06 | 1211 | 230 |
| 7-17 | 0.10 | $NH_4$ $O_2CMe$ | 77.08 | 1 | 1.20E-07 | 92 | 236 |
| 7-18 | 0.10 | $NH_4$ $O_2CMe$ | 77.08 | 2 | 2.40E-07 | 185 | 233 |
| 7-19 | 0.10 | $NH_4$ $O_2CMe$ | 77.08 | 4 | 4.80E-07 | 370 | 228 |
| 7-20 | 0.10 | $NH_4$ $O_2CMe$ | 77.08 | 8 | 9.60E-07 | 740 | 227 |
| 7-21 | 0.10 | $NH_4$ $O_2CMe$ | 77.08 | 16 | 1.92E-06 | 1480 | 228 |

While we have described a number of embodiments of this invention, it is apparent that our basic examples may be altered to provide other embodiments that utilize the compounds and methods of this invention. Therefore, it will be appreciated that the scope of this invention is to be defined by the appended claims rather than by the specific embodiments that have been represented by way of example.

What is claimed is:

1. A polymer composition, comprising:
a) a polymer selected from the group consisting of:

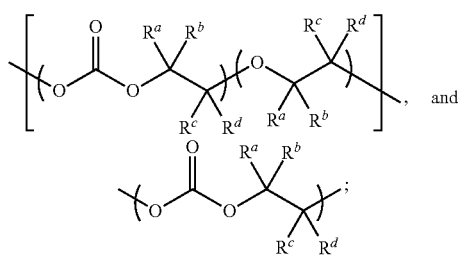

, and wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-3 heteroatoms independently selected from the group consisting of nitrogen, oxygen, and sulfur;

wherein any of ($R^a$ and $R^c$), ($R^c$ and $R^d$), and ($R^a$ and $R^b$) can be taken together with their intervening atoms to form one or more optionally substituted rings; and b) an additive comprising an organic cation characterized in that its presence modulates the decomposition temperature of the polymer composition; wherein the additive is present at a concentration in the range of about 100 to 3500 ppm by weight;

wherein the polymer composition comprises transition metals in an amount less than 10 ppm.

2. The polymer composition of claim 1, wherein the polymer contains at least 98 mole percent of the polymer repeat unit:

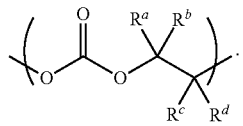

3. The polymer composition of claim 1, wherein the polymer comprises poly(propylene carbonate).

4. The polymer composition of claim 3, wherein the poly(propylene carbonate) has a molecular weight in the range of about 10,000 to about 400,000 g/mol.

5. The polymer composition of claim 4, wherein the poly(propylene carbonate) has a molecular weight in the range of about 50,000 to about 250,000 g/mol.

6. The polymer composition of claim 3, wherein the poly(propylene carbonate) has a polydispersity index less than 1.5.

7. The polymer composition of claim 3, wherein the poly(propylene carbonate) has a polydispersity index less than 1.2.

8. The polymer composition of claim 2, wherein the polymer comprises a copolymer of carbon dioxide and one or more epoxides selected from the group consisting of: ethylene oxide, propylene oxide, 1,2-butene oxide, 2,3-butene oxide, butadiene monoepoxide, 1,2-pentene oxide, epichlorohydrin, 1,2-epoxy-2-methylpropane, glycidyl ether, glycidyl ester, 1,2-hexene oxide, $C_{7-30}$ alpha olefin epoxide, cyclopentene oxide, cyclohexene oxide, 4-vinyl cyclohexene oxide, 4-ethyl cyclohexene oxide, styrene oxide, limonene oxide, norbornene oxide, cyclooctene oxide, 1,2,5,6-diepoxycyclooctane, and cyclooctadiene monoepoxide.

9. The polymer composition of claim 1, wherein the presence of the additive lowers the decomposition temperature of the polymer composition.

10. The polymer composition of claim 9, wherein the organic cation comprises a protonated amine species.

11. The polymer composition of claim 9, wherein the organic cation comprises a quaternary ammonium species.

12. The polymer composition of claim 9, wherein the organic cation is selected from the group consisting of:

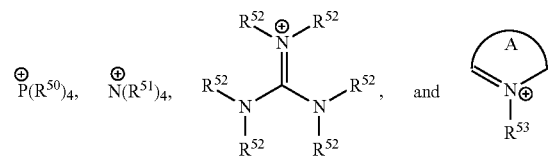

where each occurrence of $R^{50}$ is independently an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 3- to 7-membered heterocyclic having 1-2 heteroatoms independently selected from the group consisting of nitrogen, oxygen, and sulfur;

each occurrence of $R^{51}$ is independently hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic having 1-2 heteroatoms independently selected from the group consisting of nitrogen, oxygen, and sulfur; wherein two $R^{51}$ groups can be taken together with their intervening atoms to form one or more rings selected from the group consisting of: optionally substituted $C_3$-$C_{14}$ carbocycle, optionally substituted $C_3$-$C_{14}$ heterocycle, and optionally substituted $C_6$-$C_{10}$ aryl;

each occurrence of $R^{52}$ is independently hydrogen or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic having 1-2 heteroatoms independently selected from the group consisting of nitrogen, oxygen, and sulfur; wherein two $R^{52}$ groups can be taken together with their intervening atoms to form one or more rings selected from the group consisting of: optionally substituted $C_3$-$C_{14}$ carbocycle, optionally substituted $C_3$-$C_{14}$ heterocycle, optionally substituted $C_6$-$C_{10}$ aryl, and optionally substituted $C_5$-$C_{10}$ heteroaryl;

$R^{53}$ is hydrogen, hydroxyl, or an optionally substituted group selected from the group consisting of $C_{1-20}$ aliphatic; $C_{1-20}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur;

and 4- to 7-membered heterocyclic having 1-2 heteroatoms independently selected from the group consisting of nitrogen, oxygen, and sulfur;

Ring A is an optionally substituted, 5- to 10-membered heteroaryl group having 0-3 additional heteroatoms independently selected from nitrogen, oxygen, or sulfur.

13. The polymer composition of claim 12, wherein the additive is of the formula:

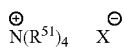

wherein each occurrence of $R^{51}$ is independently hydrogen or $C_{1-12}$ aliphatic and $X^{\ominus}$ is a suitable anion.

14. The polymer composition of claim 13, wherein each occurrence of $R^{51}$ is $C_{1-6}$ aliphatic.

15. The polymer composition of claim 14, wherein each occurrence of $R^{51}$ is butyl.

16. The polymer composition of claim 13, wherein the additive is a tetraalkylammonium carboxylate.

17. The polymer composition of claim 13, wherein the additive is selected from the group consisting of: tetramethylammonium formate, tetramethylammonium acetate, tetramethylammonium trifluoroacetate, tetramethylammonium propionate, tetramethylammonium butyrate, tetramethylammonium benzoate, tetraethylammonium formate, tetraethylammonium acetate, tetraethylammonium trifluoroacetate, tetraethylammonium propionate, tetraethylammonium butyrate, tetraethylammonium benzoate, tetrapropylammonium formate, tetrapropylammonium acetate, tetrapropylammonium trifluoroacetate, tetrapropylammonium propionate, tetrapropylammonium butyrate, tetrapropylammonium benzoate, tetrabutylammonium formate, tetrabutylammonium acetate, tetrabutylammonium trifluoroacetate, tetrabutylammonium propionate, tetrabutylammonium butyrate, tetrabutylammonium benzoate, benzyltrimethylammonium formate, benzyltrimethylammonium acetate, benzyltrimethylammonium trifluoroacetate, decyltrimethylammonium formate, decyltrimethylammonium acetate, decyltrimethylammonium trifluoroacetate, ethyltrimethylammonium formate, ethyltrimethylammonium acetate, ethyltrimethylammonium trifluoroacetate, tetrahexylammonium formate, tetrahexylammonium acetate, tetrahexylammonium trifluoroacetate, tetrapentylammonium formate, tetrapentylammonium acetate, tetrapentylammonium trifluoroacetate, tetrapropylammonium formate, tetrapropylammonium acetate, tetrapropylammonium trifluoroacetate, tributylmethylammonium formate, tributylmethylammonium acetate, tributylmethylammonium trifluoroacetate trimethylphenylammonium formate, trimethylphenylammonium acetate, and trimethylphenylammonium trifluoroacetate.

18. The polymer composition of claim 1, wherein the additive is present at a concentration in the range of about 100 to 1500 ppm by weight.

19. The polymer composition of claim 18, wherein the additive is present at a concentration in the range of about 500 to 1500 ppm by weight.

20. The polymer composition of claim 1, wherein the onset temperature of the polymer composition is in the range of about 100° C. to about 220° C.

21. The polymer composition of claim 20, wherein the onset temperature is in the range of about 120° C. to about 200° C.

22. The polymer composition of claim 21, wherein the onset temperature is in the range of about 120° C. to about 180° C.

23. The polymer composition of claim 22, wherein the onset temperature is in the range of about 120° C. to about 160° C.

24. The polymer composition of claim 23, wherein the onset temperature is in the range of about 130° C. to about 150° C.

25. The polymer composition of claim 21, wherein the onset temperature is in the range of about 150° C. to about 180° C.

26. The polymer composition of claim 22, wherein the onset temperature is in the range of about 180° C. to about 200° C.

27. The polymer composition of claim 1, wherein the polymer composition is substantially free of metals.

28. The polymer composition of claim 1, wherein the polymer composition is substantially free of transition metals.

29. The polymer composition of claim 1, wherein the polymer composition is substantially free of cobalt.

30. The polymer composition of claim 1, wherein the polymer composition comprises cobalt in an amount less than 10 ppm.

31. A method for modulating the decomposition temperature of a polymer composition, the method comprising:
a) providing a polymer selected from the group consisting of:

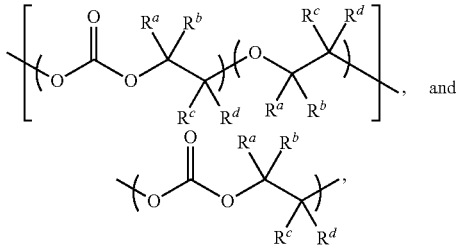

wherein:
each occurrence of $R^a$ is independently hydrogen or an optionally substituted group selected from the group consisting of $C_{1-30}$ aliphatic; $C_{1-30}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic having 1-3 heteroatoms independently selected from the group consisting of nitrogen, oxygen, and sulfur; and each occurrence of $R^b$, $R^c$, and $R^d$ is independently hydrogen or an optionally substituted group selected from the group consisting of $C_{1-12}$ aliphatic; $C_{1-12}$ heteroaliphatic having 1-4 heteroatoms independently selected from the group consisting of nitrogen, oxygen, and sulfur; 6- to 10-membered aryl; 5- to 10-membered heteroaryl having 1-4 heteroatoms independently selected from nitrogen, oxygen, or sulfur; and 4- to 7-membered heterocyclic having 1-3 heteroatoms independently selected from the group consisting of nitrogen, oxygen, and sulfur;

wherein any of ($R^a$ and $R^{ce}$), ($R^c$ and $R^d$), and ($R^a$ and $R^b$) can be taken together with their intervening atoms to form one or more optionally substituted rings; and b) admixing the polymer composition with an effective amount of an additive comprising an organic cation capable of modulating the decomposition temperature of the polymer composition;

wherein the additive is present in the polymer composition at a concentration in the range of about 100 to 3500 ppm by weight, and the polymer composition comprises transition metals in an amount less than 10 ppm.

32. The method of claim 31, wherein the additive is characterized in that it lowers the decomposition temperature of the resulting polymer composition relative to the polymer composition lacking the additive.

33. The method of claim 31, wherein the polymer composition is substantially free of metal.

34. The method of claim 31, wherein the polymer contains at least 98 mole percent of the polymer repeat unit:

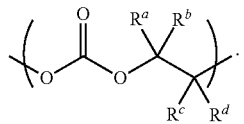

35. The method of claim 31, wherein the additive is present at a concentration in the range of about 100 to 1500 ppm by weight.

36. The method of claim 31, wherein the additive is other than bis(triphenylphosphoranylidene)ammonium chloride.

37. The method of claim 34, wherein the additive is of the formula:

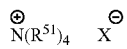

wherein each occurrence of $R^{51}$ is independently hydrogen or $C_{1-6}$ aliphatic and $X^{\ominus}$ is a suitable anion.

38. The method of claim 37, wherein each occurrence of $R^{51}$ is $C_{1-6}$ aliphatic.

39. The polymer composition of claim 30, wherein the polymer composition comprises cobalt in an amount less than 3 ppm.

40. The polymer composition of claim 39, wherein the polymer composition comprises cobalt in an amount less than 1 ppm.

41. The polymer composition of claim 1, wherein the polymer composition comprises transition metals in an amount less than 1 ppm.

42. The polymer composition of claim 13, wherein each occurrence of $R^{51}$ is hydrogen.

43. The polymer composition of claim 1, wherein each occurrence of $R^b$, $R^c$, and $R^d$ is hydrogen.

44. The polymer composition of claim 43, wherein each occurrence of $R^a$ is optionally substituted $C_{1-12}$ aliphatic.

* * * * *